US010449721B2

(12) United States Patent
Chung

(10) Patent No.: US 10,449,721 B2
(45) Date of Patent: Oct. 22, 2019

(54) SYSTEMS AND METHOD FOR MONITORING THREE-DIMENSIONAL PRINTING

(71) Applicant: Deborah D. L. Chung, East Amherst, NY (US)

(72) Inventor: Deborah D. L. Chung, East Amherst, NY (US)

(73) Assignee: Deborah D. L. Chung, E. Amherst, NY (US)

( * ) Notice: Subject to any disclaimer, the term of this patent is extended or adjusted under 35 U.S.C. 154(b) by 91 days.

(21) Appl. No.: 15/730,726

(22) Filed: Oct. 11, 2017

(65) Prior Publication Data

US 2019/0105840 A1    Apr. 11, 2019

(51) Int. Cl.
| | |
|---|---|
| *H01L 21/00* | (2006.01) |
| *B29C 64/386* | (2017.01) |
| *B33Y 30/00* | (2015.01) |
| *B33Y 50/00* | (2015.01) |
| *B29C 64/245* | (2017.01) |
| *B22F 3/00* | (2006.01) |
| *G05B 19/4099* | (2006.01) |
| *B28B 17/00* | (2006.01) |
| *B28B 1/00* | (2006.01) |
| *B33Y 70/00* | (2015.01) |

(52) U.S. Cl.
CPC ............ *B29C 64/386* (2017.08); *B22F 3/008* (2013.01); *B28B 17/0072* (2013.01); *B29C 64/245* (2017.08); *B33Y 30/00* (2014.12); *B33Y 50/00* (2014.12); *G05B 19/4099* (2013.01); *B22F 2301/052* (2013.01); *B28B 1/001* (2013.01); *B33Y 70/00* (2014.12); *G05B 2219/49007* (2013.01)

(58) Field of Classification Search
CPC ..... B29C 64/386; B29C 64/245; B33Y 30/00; B33Y 50/00; B28B 17/0072; B28B 1/001; B22F 3/008
See application file for complete search history.

(56) References Cited

U.S. PATENT DOCUMENTS

| | | | |
|---|---|---|---|
| 9,108,358 B1 * | 8/2015 | Herloski | .............. B41J 2/14104 |
| 10,265,911 B1 * | 4/2019 | Capri | ..................... G06T 7/001 |

(Continued)

FOREIGN PATENT DOCUMENTS

| | | | |
|---|---|---|---|
| EP | 3115781 A1 | 1/2017 | |
| EP | 3170591 A1 | 5/2017 | |

(Continued)

*Primary Examiner* — Richard A Booth

(57) ABSTRACT

This invention provides systems and method for monitoring three-dimensional printing of printing material. A system comprises two coplanar and electrically conductive electrodes and a substrate, which provides a printing surface. The proximate edges of the electrodes, which are on the surface, are separate by a distance ranging from 5 mm to 300 mm. Each electrode is smaller in area than the substrate. The system also comprises a plurality of layers, which are formed layer-by-layer by the printing, and are derived from the printing material. The electrodes are electrically oppositely charged, as enabled by an alternating electric current between the two electrodes. The current partly flows in the layers. The two electrodes exhibit between them a capacitance ranging from 0.1 pF to 10 nF.

20 Claims, 21 Drawing Sheets

(a)

(b)

(56) References Cited

U.S. PATENT DOCUMENTS

| | | |
|---|---|---|
| 2016/0236414 A1 | 8/2016 | Reese et al. |
| 2017/0024033 A1 | 1/2017 | Chandran et al. |
| 2017/0056967 A1 | 3/2017 | Fulop et al. |
| 2017/0269779 A1 | 9/2017 | Chan et al. |

FOREIGN PATENT DOCUMENTS

| | | |
|---|---|---|
| EP | 3170592 A1 | 5/2017 |
| EP | 3170593 A1 | 5/2017 |
| WO | WO 2016094827 A1 | 6/2016 |
| WO | WO 2016037268 A1 | 3/2017 |
| WO | WO 2017039858 A1 | 3/2017 |

* cited by examiner (a)

(b)

(a)

(b)

(a)

(b)

(a)

(b)

SYSTEMS AND METHOD FOR MONITORING THREE-DIMENSIONAL PRINTING

FIELD OF THE INVENTION

The present disclosure relates to the field of three-dimensional printing monitoring.

BACKGROUND OF THE INVENTION

The field of three-dimensional (3D) printing is growing explosively, due to its importance for rapid prototyping, custom manufacturing and the manufacturing of complex shapes. This printing method involves layer-by-layer printing so that the totality of the layers corresponds to the 3D object.

In spite of the growth and importance of 3D printing, the printed object is often not perfect, due to the inadequate control of the dimensions, the presence of pores, the variation of the composition, etc. Assessment of the perfection of a 3D printed object can be performed by microscopy, x-radiography, ultrasonic inspection, and eddy current inspection (which applies to metal printing and does not apply to polymer printing). Although such assessment provides valuable information on the defects present after the printing operation, it does not provide monitoring during the printing. The absence of monitoring during printing means that is not possible to correct the problem that causes the defects as the printing progresses. On the other hand, if the assessment is conducted during the printing (rather than after the printing), the defects in a particular layer can be identified as the layer is printed. With this information, the printing process can be suitably adjusted so as to avoid the formation of such defect in the subsequent layers to be printed. This renders the printing smart, as in smart manufacturing. Furthermore, the layer-by-layer assessment during the printing provides a layer-by-layer record of the quality of the printed object. Therefore, the development of methods of 3D printing monitoring is much needed.

Methods of 3D printing monitoring in the prior art involve surface profile measurement (US 2017/0056967), surface temperature measurement (US 2017/0056967), vibration sensing (EP 3170591), gas flow sensing (EP 3170593), acoustic sensing (EP 3170592), optical imaging (WO 2017039858, US 20160236414), thermal imaging (US 2015-62146871, US 20160236414), X-ray imaging (WO 2016094827), and magnetic field sensing (WO 2016094827). Other related methods include thermal infrared imaging (for observing the temperature distribution during the printing), interferometric measurement of the layer thickness, and optical analysis of the degree of curing of the resin. All of the methods mentioned above suffer from low spatial resolution and inadequate sensitivity to microscopic defects. In case of interferometric methods, an additional problem relates to the requirement that the material is transparent. Furthermore, the required placement of cameras or measurement components (sources and sensors pertaining to the optical, electromagnetic, laser, x-ray, infrared, thermal, acoustic and magnetic methods of monitoring) close to the local area of the object being printed complicates the implementation of these methods. In addition, cameras and measurement components are expensive.

In case of metal printing that involves the deposition of liquid metal droplets on a substrate, the quality or characteristics of the metal droplets are not simply related to the quality or characteristics of the solidified metal. This is because the solidified metal is formed from the deposition of a large number of droplets and how the different droplets interact and come together matter greatly to the quality and characteristics of the solidified metal. For example, the degree of bonding between the solidified droplets and the possible presence of voids between the solidified droplets affect greatly the quality and characteristics of the solidified metal in the 3D printed object. Therefore, methods to monitor the liquid metal droplets being expelled from the nozzle of the vessel holding the metal feedstock for the metal printing (US 2017/0056967) are not capable of and not applicable to the monitoring of the printed solid material during the printing.

In case of metal printing that involves the deposition of liquid metal droplets on a substrate, the efficient expulsion of the liquid metal droplets from the nozzle of the vessel holding the metal feedstock for the metal printing is important.

The capacitance, resistance and inductance are the three fundamental electronic components. The inclusion of one or more capacitors in a circuit is very common in electronics.

The capacitance describes the ability of a physical body to store an electric charge. Capacitance is measured in units known as Farads (abbreviated F). By definition of capacitance, a capacitor of 1 Farad holds a voltage of 1 Volt across the plates of the capacitor when it is charged with a current of 1 Ampere for a time period of 1 second. Instead of applying a current of 1 Ampere for 1 second, one can apply a current of 0.5 Ampere for 2 seconds and obtain the same amount of charging. The charge corresponding to this amount of charging is 1 Coulomb, since 1 Ampere is by definition equal to 1 Coulomb per second. In other words, a capacitance of 1 Farad stores 1 Coulomb with a voltage of 1 Volt across the plates of the capacitor. The charges on the two plates of the capacitor are equal in magnitude but opposite in sign. The amount of charging mentioned above corresponds to a charge of +1 Coulomb on one plate and a charge of −1 Coulomb on the other plate of the capacitor. The magnitude of the charge of an electron is $1.6 \times 10^{-19}$ Coulomb.

Capacitances ranging from 0.1 pF (1 picofarad=1 pF=$10^{-12}$ F) to 10 F can be measured using appropriate electronic meters such as LCR meters. Multimeters for voltage measurement typically allow the measurement of capacitances ranging from nanofarads (1 nanofarad=1 nF=$10^{-9}$ F) to a few hundred microfarads (1 microfarad=1 μF=$10^{-6}$ F). LCR meters give more accurate capacitance measurement than multimeters, in addition to allowing the measurement of a wider range of capacitance.

A capacitor is an open circuit under direct current (DC) condition, but current can pass through a capacitor under alternating current (AC) condition. The higher the frequency, the greater is the current that passes through a capacitor. The higher the voltage across the plates of a capacitor, the greater is the current that passes through the capacitor.

The capacitance of a capacitor is inversely related to the thickness of the dielectric material sandwiched by the two plates of the capacitor. On the other hand, it is proportional to the electric permittivity of this dielectric material. The electric permittivity of a material is equal to the product of the relative permittivity of the material (a dimensionless quantity) and the permittivity of free space (a universal constant equal to $8.85 \times 10^{-12}$ F/m).

Electric polarization refers to the separation of the positive and negative charge centers in a material. It stems from the movement of charged particles (e.g., ions, electrons, etc.)

in response to an applied electric field. Positively charged particles move toward the negatively charged plate of a capacitor, while negatively charged particles move toward the positively charged plate. Under an AC electric field, the polarity of each of two plates changes with time, so the charged particles (e.g., ions, electrons, etc.) of a given sign would move back and forth between the two plates as the polarity changes. The ability of the charged particles to respond to the electric field tends to decrease with increasing frequency. This is because the charged particles may not move fast enough to keep track of the changing polarity when the frequency is too high. The greater is the tendency for a material to be polarized under an electric field, the higher is the relative permittivity of the material.

Associated with the charge storage in a capacitor, as mentioned above, is electrical energy storage. This is because it takes electrical energy to separate charges of opposite sign. The electrical energy stored in a capacitor with capacitance C and voltage V (across the electrodes of the capacitor) is given by the well-known equation $$\text{Energy stored} = \tfrac{1}{2}CV^2. \tag{1}$$

Therefore, both the voltage V and capacitance C must to be non-zero in order for the energy stored in the capacitor to be non-zero.

Electrohydrodynamics (EHD) refers to the study of the dynamics of electrically charged fluids. It entails the conversion of electrical energy to kinetic energy, which can be used to move a fluid. The electrical energy is given by Eq. (1). The voltage and capacitance mentioned in US 2017/0056967 are for providing the electrical energy and the associated electrostatic field that are used for the EHD-based expulsion of the liquid metal droplets out of the nozzle, as is relevant to 3D metal printing using liquid metal droplets. The voltage and capacitance in US 2017/0056967 are for providing the electrical energy and are not related to 3D printing monitoring. In particular, they are not capable of and not applicable to the monitoring of the printed solid material during the printing.

Capacitive sensing is important for touch sensing, as needed for touch screens, which are commonly used in electronic devices such as computers. Touch sensing is based on the concept that the human finger is an electrical conductor and its contact with an electrical circuit changes the capacitance of the circuit. In connection with touch screens, a large variety of electrode patterns and associated circuits have been taught (US 20170269779, US 20170024033, WO 2016037268). However, such sensing systems are not capable of and not applicable to the monitoring of 3D printing. The use of such concepts would be very expensive, due to the electrical circuit. In addition, the electrical circuit cannot withstand elevated temperatures, which are encountered in 3D metal printing.

The alternating current (AC) impedance differs from the direct current (DC) resistance in that it is a complex quantity that consists of a real part (the resistance) and an imaginary part (the capacitance and inductance, with the capacitance being more relevant to the subject of this disclosure than the inductance).

The alternating current (AC) impedance depends on the AC frequency. The variation of the electrical impedance with the frequency can be analyzed in terms of equivalent circuit models for describing the electrical behavior. The analysis typically involves the fitting of the curve in the Nyquist plot (the plot of the imaginary part of the impedance to the real part of the impedance for various frequencies). However, the equivalent circuit model obtained by the curve fitting is not unique. As a consequence of the non-uniqueness, the values of the circuit parameters (resistances and capacitances) in the circuit model are only meaningful in the context of the particular circuit model and are not generally meaningful.

The implementation of resistance measurement involves the application of electrical contacts. The electrical resistance associated with an electrical contact must be small enough, so that it does not overshadow the resistance associated with the volume of the cement-based material. Thus, the electrical contacts must be high in quality, with the electrically conductive material (typically a metal or a metal alloy) that makes up the electrical contact being in intimate contact with the cement-based material. Even if the resistance of the electrical contact is small, it may still vary as the condition (e.g., stress, strain, damage, temperature, etc.) changes. This means that both the resistance of the electrical contact and the resistance of the volume of the cement-based material change with the condition. The volume resistance is the quantity that is indicative of the condition being sensed. The variation of the contact resistance with the condition may cause the measured resistance (which includes both the contact resistance and the volume resistance) to be not indicative of the condition, thereby causing the sensing to be misleading. To alleviate this problem, four electrical contacts are used, with the outer two contacts for passing current and the inner two contacts for measuring the voltage. The resistance measured is this voltage divided by this current, and is the resistance between the two inner contacts. Because essentially no current flows through a voltage contact, there is essentially no potential (voltage) drop at each of the two voltage contacts. Therefore, the resistance obtained using four electrical contacts largely eliminates the contact resistance from the measured resistance. In contrast, the use of only two electrical contacts, with each contact serving for both current passing and voltage measurement, causes the measured resistance to include the contact resistance. In spite of the superior reliability of the method involving four electrical contacts compared to the method involving two electrical contacts, the former makes the implementation of the technique more difficult. In other words, installing four electrical contacts to measure the resistance of a segment of a cement-based structure is much more inconvenient (more labor intensive) than installing two electrical contacts.

Because the electrical impedance includes the electrical resistance (its real part), the measurement of the impedance involves the same issues as mentioned above for the measurement of the resistance. An issue pertains to the requirement that the electrical contacts are associated with low values of the contact resistance. Another issue pertains to the need for using four electrical contacts rather than two electrical contacts in order to essentially eliminate the contribution of the contact resistance to the measured resistance.

The measurement of the capacitance has its issues too. An issue pertains to the fact that an LCR meter (also known as an impedance meter) is not designed for measuring the capacitance of an electrical conductor. When an impedance meter is used for testing a conductive material, the capacitance value that it outputs can be off from the true value by a large amount (even off by orders of magnitude).

The parallel-plate capacitor geometry is commonly and classically used for measuring the capacitance of a material that is sandwiched by the two facing plates (i.e., two conductor plates commonly referred to as electrodes). The capacitance is in the direction perpendicular to the plates. Due to the small thickness of the material being tested between the two plates and the large area, the capacitance can be rather large. Thus, this variation of the parallel-plate capacitor geometry is effective for obtaining information that pertains to the capacitance. On the other hand, due to the small thickness and large area, the resistance can be rather small, though the value depends on the resistivity of the material.

In a less common variation of the parallel-plate capacitor geometry, the material being tested is positioned between the parallel proximate edge surfaces of two coplanar plates (EP 3115781). The capacitance measured is in the direction perpendicular to the two edge surfaces. This geometry tends to be associated with a small capacitance, due to the large thickness of the material being tested between the two edges (i.e., the large distance between the edges surfaces) and the small area of the capacitor (i.e., the small area of each of the edge surfaces). Thus, this variation of the parallel-plate capacitor geometry is not effective for obtaining information that pertains to the capacitance. On the other hand, due to the large thickness and small area, the resistance tends to be rather large, though this value depends on the resistivity of the material.

A parallel-plate capacitor actually involves three capacitors in series electrically, whether the electrodes are facing or coplanar. The three capacitors that are electrically in series consist of the capacitance of the sandwiched volume of the material being tested, and the capacitance of each of the two interfaces, with each interface being that between the sandwiched material and one of the two electrodes. The well-known equation for capacitors in series is $$1/C = 1/C_1 + 1/C_2 + 1/C_3, \qquad (2)$$

where C is the overall capacitance of the three capacitors (with capacitances $C_1$, $C_2$ and $C_3$) in series. Hence, the measured capacitance C of the parallel-plate capacitor is given by $$1/C = 1/C_v + 2/C_i, \qquad (3)$$

where $C_v$ is the capacitance of the volume of sandwiched material and $C_i$ is the capacitance of one of the two interfaces. Thus, neglecting $C_i$, thereby assuming that $C = C_v$, can result in an incorrect determination of $C_v$ from the measured C.

The relative electric permittivity is a material property that reflects the degree of damage in the material. The relative permittivity κ is obtained from $C_v$ using the well-known equation $$C_v = \varepsilon_o \kappa A / l, \qquad (4)$$

where $\varepsilon_o$ is the permittivity of free space ($8.85 \times 10^{-12}$ F/m), A is the area of the sandwich (i.e., the area of each electrode, which is the same as the area of the sandwiched material being tested), and l is the thickness of the material sandwiched by the two electrodes. Without a reliable determination of $C_v$, κ cannot be reliably obtained by using Eq. (4). Specifically, neglecting the term $2/C_i$ in Eq. (3) causes $1/C_v$ to be overestimated, thus causing $C_v$ to be underestimated, and causing κ to be also underestimated.

The measurement of the impedance or capacitance requires an LCR meter (or an impedance meter). The higher the frequency, the more expensive is the meter, and the less effective is the sensing of chemical species that cannot respond to rapid changes in the polarity of the AC electric field used for the impedance or capacitance measurement. Thus, the effectiveness of a technique that operates at a low frequency is desirable.

The present invention is directed to overcoming these and other deficiencies in the art.

SUMMARY OF THE INVENTION

This invention provides a novel method of 3D printing monitoring. The method is applicable to monitoring the 3D printing of various materials, including metal-based materials, polymer-based materials, cement-based materials, and ceramic-based materials. The method is directed at monitoring the printed solid material rather than the printing material (feedstock material) during the layer-by-layer printing. The printed solid material is derived from the printing material.

The method involves two essentially coplanar electrodes that are electrically conductive and positioned on a substrate, which provides a surface on which the printing occurs and is substantially electrically non-conductive. The proximate edges of the electrodes are essentially parallel and are separate from one another by a distance. Each of said electrodes is substantially smaller in area than said substrate. During the printing, the object to be formed by the printing is formed layer-by-layer on the substrate. An alternating current (AC current) flows from one electrode to the other electrode, such that it partly flows in the layers. In the monitoring, the capacitance between the two electrodes is measured. This capacitance is substantially in the direction perpendicular to the proximate edges of the two electrodes.

In case of the 3D printing of a metal-based material, the substrate is less electrically conductive than the metal-based layers that constitute the printed object, and the two electrodes are preferably electrically connected (though not short-circuited, i.e., not causing the resistance between the two electrodes to be very small or negligible). The electrical connection is positioned on the substrate and is in the plane of the substrate; it provides an exterior surface on which the printing occurs. The electrical connection is more electrically conductive than the substrate.

DETAILED DESCRIPTION OF THE INVENTION

This invention provides systems for monitoring the three-dimensional printing, including a system for monitoring the three-dimensional printing of metal-based materials. The invention also provides a method of monitoring three-dimensional printing.

Figure 1:
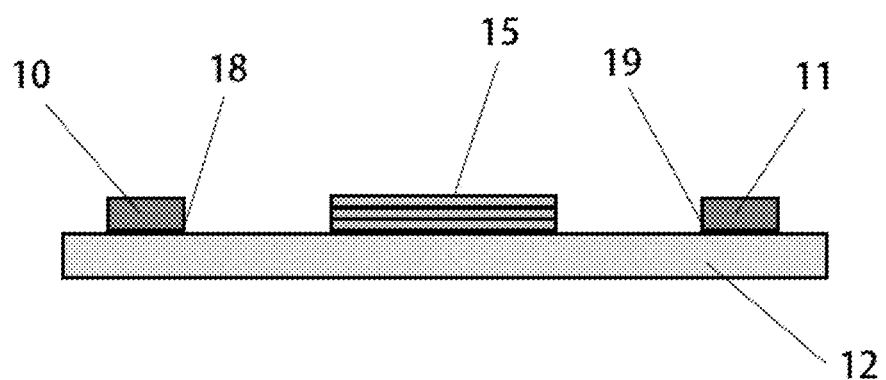
FIG. 1 shows the side view of the basic configuration for 3D printing monitoring. This configuration involves two electrodes (10 and 11) positioned on a substrate (12). The proximate edges (18 and 19) of the two electrodes are essentially parallel. The printing area (i.e., the area for positioning the layers 15 being printed) is located in the region that extends essentially from edge 18 to edge 19.

This invention provides a system for monitoring the three-dimensional printing of printing material. This system (illustrated in FIGS. 1 and 2) comprises two essentially coplanar electrodes (10 and 11), which are electrically conductive. The system also comprises substrate (12), which provides a surface on which the printing occurs. The substrate is substantially electrically non-conductive. The electrodes are positioned on the substrate. The proximate edges (18 and 19) of the electrodes are essentially parallel. The edges are separate from one another by a distance, which ranges from 5 mm to 300 mm. Each of said electrodes is substantially smaller in area than said substrate. The system also comprises a plurality of layers (15), which are formed layer-by-layer on the substrate (12) by the printing. The layers are derived from the printing material. For example, the printing material is a liquid metal, whereas the layers derived from the printing material are the metal that has been solidified from the liquid metal. The layers are positioned in a region, which extends in the direction essentially perpendicular to the edges from the location of one edge (18) to the location of the other edge (19) essentially in the plane of the surface. The two electrodes (10 and 11) are electrically oppositely charged, as enabled by an alternating electric current, which flows from one electrode to the other electrode. The alternating electric current partly flows in the layers (15). The two electrodes (10 and 11) exhibit a capacitance between them. This capacitance ranges from 0.1 pF to 10 nF. The capacitance is essentially in a direction parallel to the surface and substantially perpendicular to the proximate edges.

The layers (15) are preferably selected from the group consisting of: metal, metal alloy, metal-based material, metal-matrix composite, aluminum, copper, nickel, titanium, steel, ceramic, ceramic-based material, ceramic-matrix composite, aluminum oxide, aluminum nitride, silicon carbide, silicon dioxide, cement-based material, cement paste, cement mortar, concrete, polymer, polymer-based material, polymer-matrix composite, thermosetting polymer, thermoplastic polymer, biopolymer, photopolymer, organic-based material, and combinations thereof.

The substrate (12) preferably comprises material selected from the group consisting of: ceramic, ceramic-based material, ceramic-matrix composite, aluminum oxide, aluminum nitride, silicon carbide, silicon dioxide, polymer, polymer-based material, polymer-matrix composite, organic-based material, cement-based material, cement paste, cement mortar, concrete, and combinations thereof. The two electrodes (10 and 11) are preferably essentially the same in composition and preferably comprise material selected from the group consisting of: metal, metal alloy, metal-based material, metal-matrix composite, aluminum, copper, nickel, titanium, steel, electrically conductive polymer, and combinations thereof. The electrodes (10 and 11) are preferably electrically connected, the electrical connection (16) being positioned on the substrate (12), being in the plane of said substrate (12), and providing an exterior surface on which said printing occurs; the electrical connection (16) is preferably more electrically conductive than the substrate.

Figure 3:
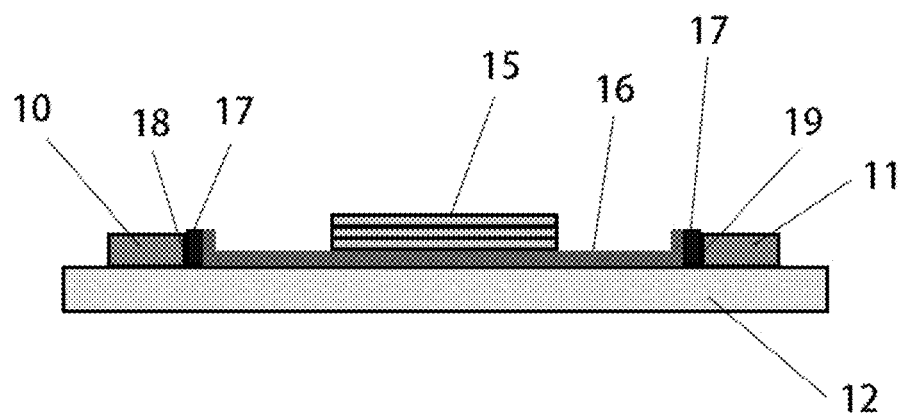
FIG. 3 shows the side view of an embodiment of the configuration for 3D printing monitoring. This configuration involves two electrodes (10 and 11) positioned on a substrate (12). The proximate edges (18 and 19) of the two electrodes are essentially parallel. The printing area (i.e., the area for positioning the layers 15 being printed) is located in the region that extends essentially from edge 18 to edge 19. The two electrodes (10 and 11) are electrically connected using an electrical connection (16) which extends essentially from electrode 10 to electrode 11. Positioned between each edge (18 and 19) and electrical connector 16 is a dielectric film 17.
Figure 4:
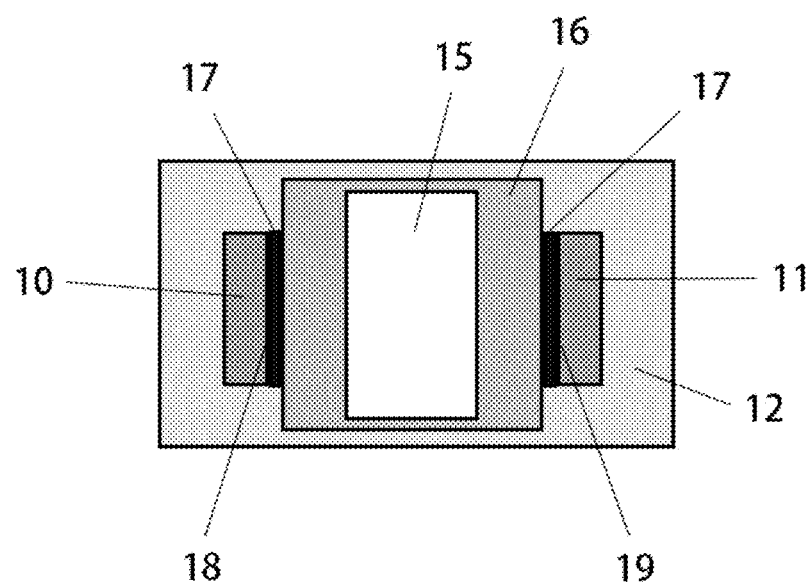
FIG. 4 shows the top view of the embodiment of the configuration for 3D printing monitoring. This top view corresponds to the side view shown in FIG. 3. The layers 15 extend essentially along the length of the electrodes, such that their length can exceed the length of the electrodes. The electrical connector 16 extends essentially along the length of the electrodes, such that its length can exceed the length of the electrodes. The layers 15 are completely on electrical connector 16. Dielectric film 17 extends essentially the complete length of the electrodes.

This invention also provides a system for monitoring three-dimensional printing of printing material. The system (as illustrated in FIGS. 3 and 4) comprising two essentially coplanar electrodes (10 and 11), which are electrically conductive. This system also comprises substrate (12), which provides a surface on which the printing occurs. The electrodes are positioned on the substrate (12). The proximate edges (18 and 19) of the electrodes are essentially parallel. The edges (18 and 19) are separate from one another by a distance. Each of said electrodes is substantially smaller in area than said substrate (12). The system also comprises a plurality of layers (15), which are formed layer-by-layer on the substrate (12) by the printing, and are derived from the printing material. The layers (15) comprise material selected from the group consisting of: metal, metal alloy, metal-based material, metal-matrix composite, aluminum, copper, nickel, titanium, steel, and combinations thereof. The layers (15) are positioned in a region, which extends in the direction essentially perpendicular to said edges from the location of one said edge (18) to the location of the other said edge (19) essentially in the plane of said surface. The substrate (12) is less electrically conductive than the metal layers (15). The two electrodes (10 and 11) are electrically connected. The electrical connection (16) is positioned on the substrate (12) and is in the plane of the substrate (12). The electrical connection provides an exterior surface on which the printing occurs. Furthermore, the electrical connection (16) is more electrically conductive than the substrate (12). The two electrodes (10 and 11) are electrically oppositely charged, as enabled by an alternating electric current, which flows from one electrode to the other electrode. The alternating electric current partly flows in the layers (15). The two electrodes (10 and 11) exhibit a capacitance between them. This capacitance ranges from 0.1 pF to 10 nF. The capacitance is essentially in a direction parallel to the surface and substantially perpendicular to the proximate edges.

The distance mentioned in the last paragraph preferably ranges from 5 mm to 300 mm. The electrical connection (16) preferably comprises material selected from the group consisting of: metal, metal alloy, metal-based material, metal-matrix composite, aluminum, copper, nickel, titanium, steel, and combinations thereof. The electrical connection extends essentially the distance between said two proximate edges (18 and 19); a dielectric film (18 and/or 19), which exhibits substantial electrical resistance, is preferably positioned between the electrical connection and at least one of the electrodes (10 and 11). The substrate (12) preferably comprises material selected from the group consisting of: ceramic, ceramic-based material, ceramic-matrix composite, aluminum oxide, aluminum nitride, silicon carbide, silicon dioxide, and combinations thereof. The two electrodes (10 and 11) preferably comprise material selected from the group consisting of: metal, metal-based material, metal alloy, metal-matrix composite, aluminum, copper, nickel, titanium, steel, and combinations thereof, and are preferably essentially the same in composition.

The dielectric film (18 and/or 19) preferably has thickness less than 200 μm. In case of printing that involves elevated temperatures (as in the case of typical metal printing), the dielectric film should be a material that can withstand the elevated temperatures. Examples of materials that can withstand the elevated temperatures are ceramic fiber mats, ceramic sheets, and ceramic fabric.

This invention also provides a method of monitoring three-dimensional printing of printing material. This method comprises as the first step positioning two essentially coplanar electrodes (10 and 11) on a substrate (12). The electrodes (10 and 11) are electrically conductive. The proximate edges (18 and 19) of the electrodes (10 and 11) are essentially parallel and are separate from one another by a distance. Each of said electrodes (10 and 11) is substantially smaller in area than said substrate (12), which provides a surface on which the printing occurs. The substrate (12) is substantially electrically non-conductive. The printing involves layer-by-layer formation of a plurality of layers (15) on the substrate (12). The layers (15) are derived from the printing material, and are positioned in a region, which extends in the direction essentially perpendicular to said edges from the location of one said edge (18) to the location of the other said edge (19) essentially in the plane of the surface. The electrodes (10 and 11) are electrically oppositely charged, as enabled by an alternating electric current, which flows between said two electrodes (10 and 11). The alternating electric current partly flows in the layers (15). The method also comprises as the second step measuring the capacitance between the two electrodes (10 and 11).

The distance mentioned in the last paragraph preferably ranges from 5 mm to 300 mm. The two electrodes (10 and 11) are preferably essentially the same in composition and preferably comprise material selected from the group consisting of: metal, metal alloy, metal-based material, metal-matrix composite, aluminum, copper, nickel, titanium, steel, electrically conductive polymer, and combinations thereof. The substrate (12) preferably comprises material selected from the group consisting of: ceramic, ceramic-based material, ceramic-matrix composite, aluminum oxide, aluminum nitride, silicon carbide, silicon dioxide, cement-based material, cement paste, cement mortar, concrete, polymer, polymer-based material, polymer-matrix composite, organic-based material, and combinations thereof. The layers (15) preferably comprise material selected from the group consisting of: metal, metal alloy, metal-based material, metal-matrix composite, aluminum, copper, nickel, titanium, steel, ceramic, ceramic-based material, ceramic-matrix composite, aluminum oxide, aluminum nitride, silicon carbide, silicon dioxide, cement-based material, cement paste, cement mortar, concrete, polymer, polymer-based material, polymer-matrix composite, thermosetting polymer, thermoplastic polymer, biopolymer, photopolymer, organic-based material, and combinations thereof. The two electrodes (10 and 11) are preferably electrically connected, with the electrical connection (16) being positioned on the substrate (12), being in the plane of the substrate (12), and providing an exterior surface on which the printing occurs; this electrical connection (16) is preferably more electrically conductive than the substrate.

This invention provides a novel technique of 3D printing monitoring. The technique involves electrical measurement in the form of capacitance measurement. The installation of devices in the printer is not necessary. Only electrodes need to be placed on the substrate (also known as the build plate).

Figure 2:
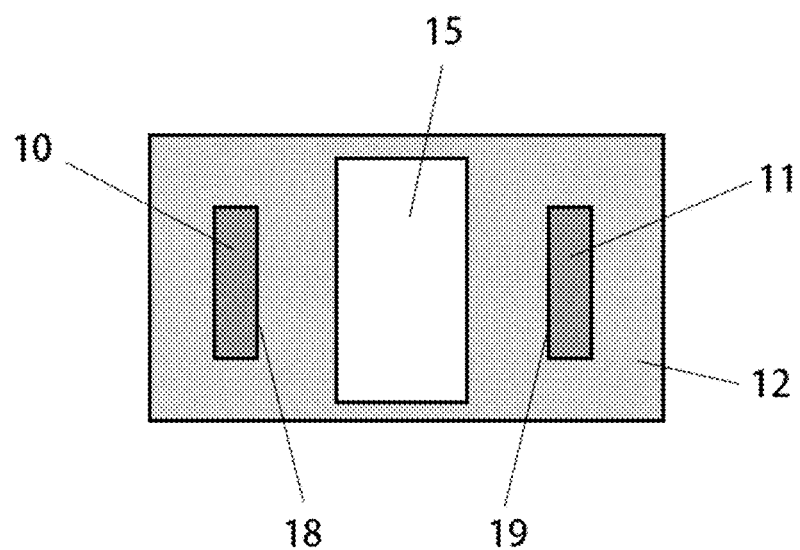
FIG. 2 shows the top view of the basic configuration for 3D printing monitoring. This top view corresponds to the side view shown in FIG. 1. The layers 15 extend essentially along the length of the electrodes, such that their length can exceed the length of the electrodes.

The electric field extending from one electrode to the other electrode spreads to the regions beyond the region between the two electrodes, thus enabling the monitoring of printed layers in the region between the electrodes as well as the regions in the vicinity of the electrodes. As illustrated in FIGS. 2 and 4, the printed layers can extend beyond the length of the electrodes, although they can be shorter than the length of the electrodes. The technique is effective for following the progress of layer-by-layer printing and for detecting defects in specific printed layers as the printing progresses.

Relevant to this invention are a wide variety of 3D printing methods, which include Material Jetting, 3D Inkjet Printing (3DP), Polyjet Printing (MJP), Material Extrusion, Directed Energy Deposition (DED), Laser Metal Deposition (LMD), metal-wire-based Electron Beam Melting (EBM), and Fused Deposition Modelling (FDM).

EXAMPLES

Example 1

The 3D printing monitoring is shown by laboratory simulation for up to 20 layers (consolidated by a pressure of 2.71 kPa in the laboratory simulation) and for fractional layers down to ⅛ of a layer. The method involves placing two copper electrodes on the substrate used for printing and measuring the capacitance between the two electrodes using an LCR meter at 2.000 kHz. The AC voltage between the two electrodes is 1.000 V.

The capacitance increases with increasing pressure applied on the electrodes and levels off as the pressure increases. Therefore, a chosen adequate pressure is applied on each copper electrode in order to achieve a leveled-off high value of the capacitance. The pressure is 2.77 kPa and 30.12 kPa for polymer-based material printing and metal-based material (aluminum) printing, respectively. The capacitance is measured both for the bare substrate and for the substrate with the printed layer(s) on it.

In case of the printing of a metal-based material, the demonstration involves aluminum layers (16 µm thick for each layer) on an aluminum oxide substrate. The monitoring is effective for electrode spacing up to 76 mm.

In case of the printing of a polymer-based material, the demonstration involves cellulosic paper layers (99 µm thick for each layer) on a cellulosic paper substrate. The presence of slots in the cellulosic paper substrate reduces the contribution of the substrate to the measured capacitance.

The fractional change in capacitance per layer is up to 0.41 and 0.0140 for polymer printing and aluminum printing, respectively. For polymer printing on a slotted cellulosic paper substrate, the capacitance of the region between the two electrodes is 1.65 and 9.48 pF for 0 and 10 layers, respectively. For aluminum printing on aluminum oxide, the capacitance of the region between the two electrodes is 15.55 and 25.65 pF for 0 and 10 layers, respectively.

The capacitance method is also effective for the detection of defects in the printed layer, as shown for aluminum printing on aluminum oxide. The capacitance decreases monotonically with increasing amount of defects. The sensitivity for defect detection is enhanced by adhering the ends of the aluminum layer closest to the substrate to the copper electrodes, so as to promote the current through this aluminum layer, and hence also promoting the current through the layers above this aluminum layer.

Example 2

The laboratory simulation of 3D printing involves layer-by-layer stacking of a material in the form of a thin sheet, with the stack being built on the surface of a substrate, and measuring the in-plane capacitance (i.e., the capacitance in the plane of the surface) of the stack using essentially coplanar copper electrodes that are on the substrate away from the stack.

Four configurations are used. Configuration I (FIG. 5) involves an unmodified cellulosic paper (commercial writing paper with conventional cellulosic fibers) substrate, whereas configuration II (FIG. 6) involves a modified cellulosic paper substrate. The substrate modification in configuration II involves the presence of 15 slots that are equally spaced at a distance of 2.0 mm and are all perpendicular to the surface of the substrate and are parallel to the proximate edges of the electrodes. The slots are made using an office paper cutter and serve to decrease the contribution of the substrate to the measured capacitance of the system consisting of the substrate and the stack. By decreasing the substrate contribution to the measured capacitance, the sensitivity of the monitoring of the stack built on the substrate is enhanced.

The stack consists of various numbers of layers that range from 1 to 20. In case of a single layer, various fractions of a layer are used, such that each fractional layer is rectangular, centered between the two electrodes, and parallel to the proximate edges of the electrodes.

In configurations I and II, ordinary commercial writing paper (cellulose fiber paper) of thickness 98.7±0.3 µm (as obtained by measuring the thickness of a stack of 10 sheets of the paper and dividing this thickness by 10) constitutes the thin sheet (layer) used to form the stack for the simulation of layer-by-layer printing of a polymer-based material. The paper is used both as the substrate and the layers in the layer-by-layer printing (FIGS. 5 and 6).

Figure 5:
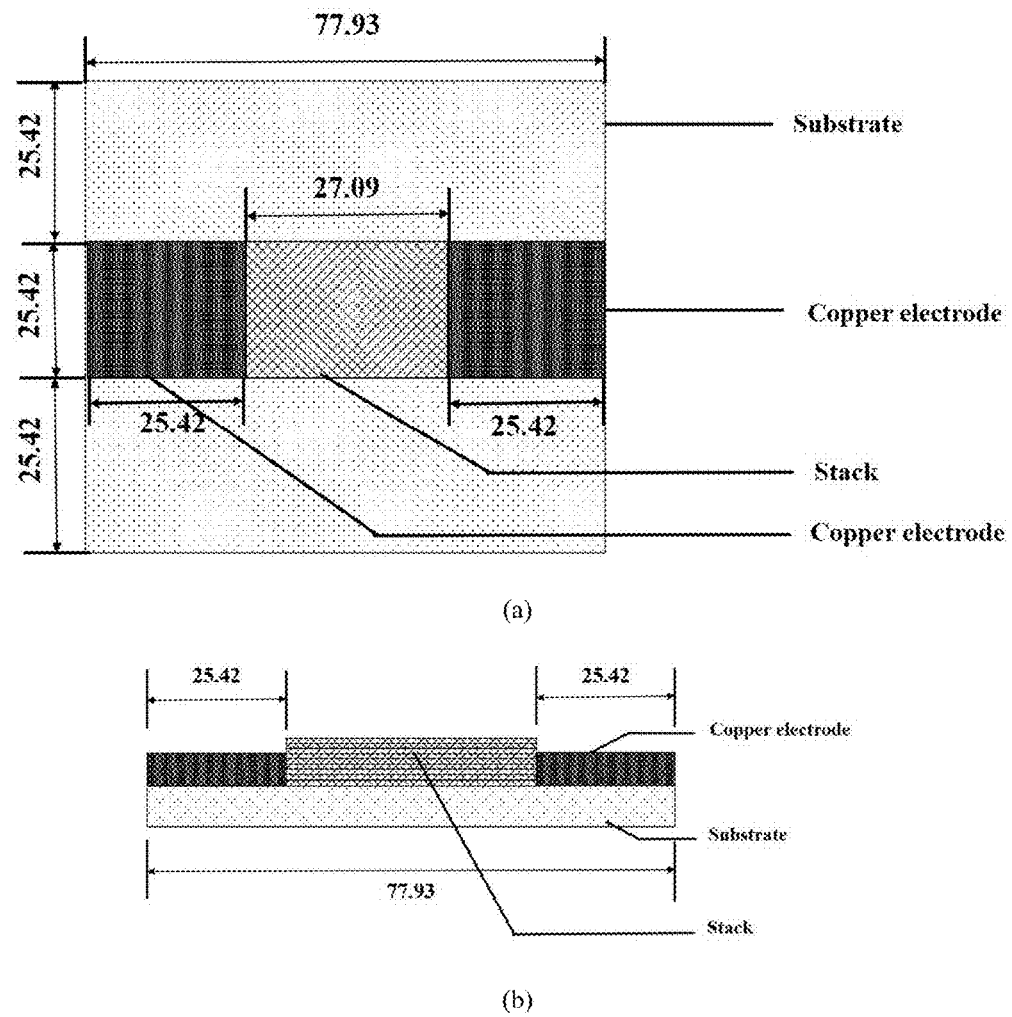
FIG. 5 illustrates testing configuration I, which involves the printing of a polymer-based material on a polymer-based substrate, such that the substrate is not modified (having no slot cut into the substrate). The stack of the multiple layers that constitute the layers in the printed object is on the substrate and is positioned in the region between the two electrodes. The two essentially coplanar electrodes (copper in the laboratory simulation) are positioned on the two sides of the stack region and are on top of the substrate. An insulating (dielectric) film is present between the electrode and substrate in case of the monitoring of the printing of a metal-based material, but not for the monitoring of the printing of a polymer-based material that is substantially non-conductive electrically. In the laboratory simulation of monitoring the printing of a polymer-based material, cellulosic paper is used as both the polymer-based layer and the polymer-based substrate. All dimensions are in mm. The vertical dimensions are not to scale. (a) Top view. (b) Side view.
Figure 6:
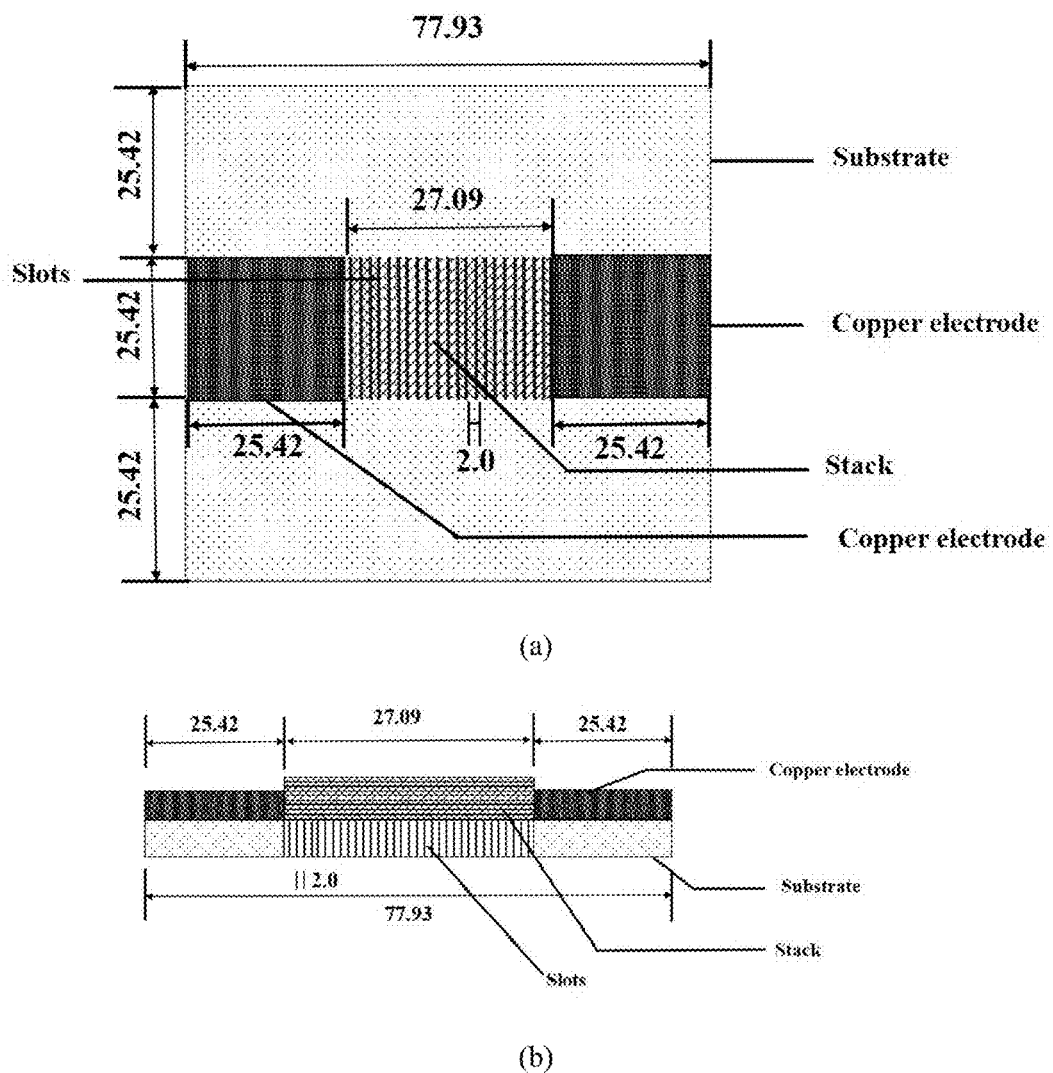
FIG. 6 illustrates testing configuration II, which involves the printing of a polymer-based material on a polymer-based substrate, such that the substrate has been modified (having multiple slots cut into the substrate). The stack of the multiple layers that constitute the layers in the printed object is positioned in the region between the two electrodes. The two essentially coplanar electrodes (copper in the laboratory simulation) are positioned on the two sides of the stack region and are on top of the substrate. The insulating (dielectric) film is present between the electrode and substrate for the monitoring of the printing of a metal-based material or other materials that are electrically conductive, but not for the monitoring of the printing of a polymer-based material that is substantially non-conductive electrically. All dimensions are in mm. The vertical dimensions are not to scale. (a) Top view. (b) Side view.

In configurations I and II, the stack (area=27.09×25.42 mm$^2$=688.63 mm$^2$) is positioned and centered between the two electrodes, each of size 25.42×25.42 mm (FIGS. 5 and 6). The distance d between the electrodes is the distance between the proximate edges of the two electrodes, as measured by using calipers; its value is 27.09 mm. In case of the stack consisting of a fraction of a layer, the fractional layer is centered in the area between the two electrodes.

Figure 7:
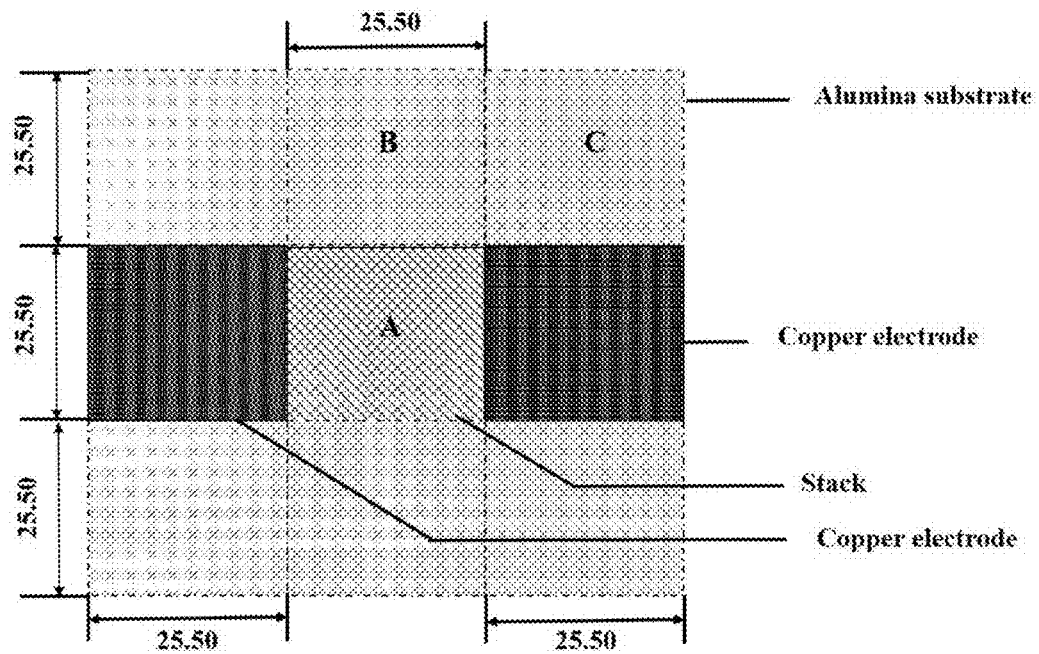
FIG. 7 illustrates testing configuration III (3×3, i.e., 3 squares by 3 squares of aluminum oxide to form the substrate, with each square of dimensions 1 inch×1 inch, so that the substrate size is 3 inches×3 inches), which involves the printing of a metal-based material on a ceramic substrate. In other words, the substrate is made up of 9 aluminum oxide squares (dimensions 1 inch×1 inch each) arranged in a 3×3 setup. In the laboratory simulation, the metal is aluminum and the ceramic is aluminum oxide. The stack of the multiple layers that constitute the layers in the printed object is on the substrate. The illustration shows the stack positioned at location A, which is the 1 inch×1 inch area between the two electrodes. The testing is performed separately with the stack at locations A, B and C. The two essentially coplanar electrodes (copper in the laboratory simulation) are positioned on the two sides of the stack region and are on top of the substrate. All dimensions are in mm. The vertical dimensions are not to scale. (a) Top view. (b) Side view.
Figure 7:
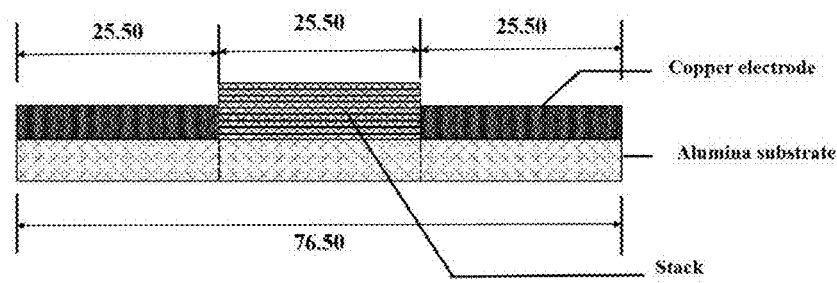

In configuration III, aluminum foil of thickness 16.4±0.1 µm constitutes the thin sheet (layer) used to form the stack for the simulation of layer-by-layer metal printing. Aluminum oxide is used as the substrate (FIG. 7). The aluminum oxide is a commercial substrate material containing 96 wt. % $Al_2O_3$. The thickness is 677±4 µm. The edge length of each square piece is 25.50±0.06 mm. A close-packed 3×3 arrangement of 9 pieces makes up a square of dimensions 76.5 mm×76.5 mm, as shown in FIG. 7(a), where locations A, B and C refer specifically to three of the nine pieces of the aluminum oxide (dimensions 25.5 mm×25.5 mm, i.e., 1 inch×1 inch for each piece) that make up the substrate with dimensions 76.5 mm×76.5 mm.

In configuration III (3×3), the stack (area=25.50 mm×25.50 mm=650.25 mm$^2$) is positioned to cover the entirety of region A, B or C, each of size 25.42×25.42 mm (FIG. 7). The distance d between the electrodes is the distance of 25.50 mm between the proximate edges of the two electrodes. In case of the stack consisting of a fraction of a layer, the fractional layer is centered in the region A, B or C.

Figure 8:
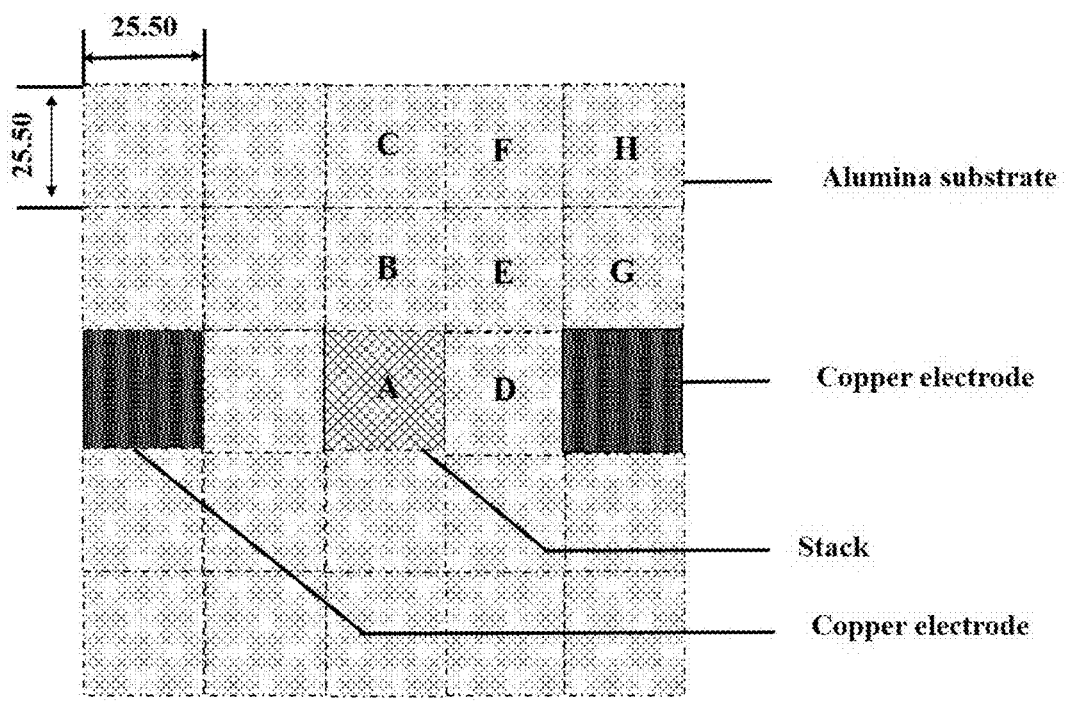
FIG. 8 illustrates testing configuration III (5×5, i.e., 5 squares by 5 squares of aluminum oxide to form the substrate, with each square of dimensions 1 inch×1 inch, so that the substrate size is 5 inches×5 inches), which involves the printing of a metal-based material on a ceramic substrate. In other words, the substrate is made up of 25 squares of aluminum oxide (dimensions 1 inch×1 inch for each square) arranged in a 5×5 setup. In the laboratory simulation, the metal is aluminum and the ceramic is aluminum oxide. The illustration shows the stack positioned at location A, which is the 1 inch×1 inch square at the center of the 5 inch×5 inch substrate. The testing is performed separately with the stack at locations A, B, C, D, E, F, G and H. The two essentially coplanar electrodes (copper in the laboratory simulation) are positioned on the two sides away from the center of the substrate and are on top of the substrate. All dimensions are in mm. The vertical dimensions are not to scale. (a) Top view. (b) Side view.

Similarly, 5×5, 7×7 and 9×9 arrangements are made, as illustrated in FIG. 8 for the 5×5 substrate arrangement, for which locations A, B, C, D, E, F, G and H are comparatively studied. The study of the multiple locations is for evaluating the effectiveness of the printing monitoring for different locations of the stack relative to the positions of the electrodes. In addition, location A is studied for the 3×3, 5×5, 7×7 and 9×9 substrate arrangements in order to investigate the effect of d on the sensing effectiveness.

Figure 9:
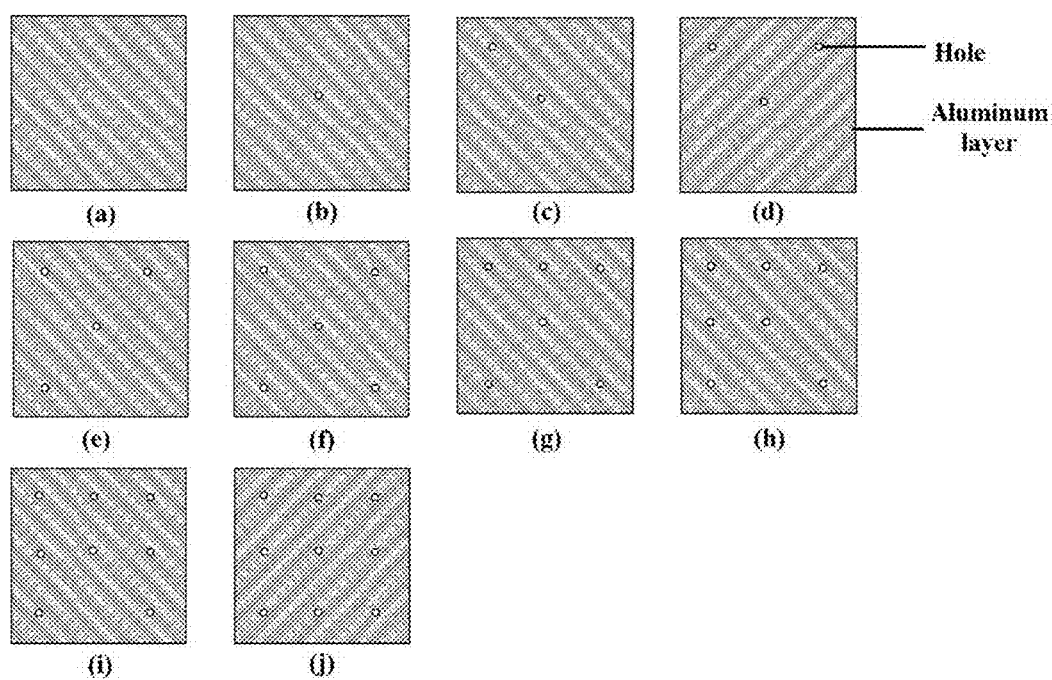
FIG. 9 illustrates the positions of the artificially made through-holes (through the thickness of a layer) that serve as defects for the demonstration of the ability to detect defects. Each hole is indicated by an open circle, which is much larger than the actual hole.

In order to test the effectiveness of the monitoring method of this invention for the detection of defects in a 25 mm×25 mm square specimen, an aluminum foil (a single layer) is punctured with through holes (made by manual penetration using a commercial thumbtack) placed at different selected locations on the specimen (FIG. 9). Initially, the capacitance is measured for the case without holes. Thereafter, capacitance measurements are taken with the addition of each new hole. These holes constitute the defects to be detected by capacitance measurement. The aluminum specimen is placed at location A of configuration III (substrate arrangement 3×3).

Figure 10:
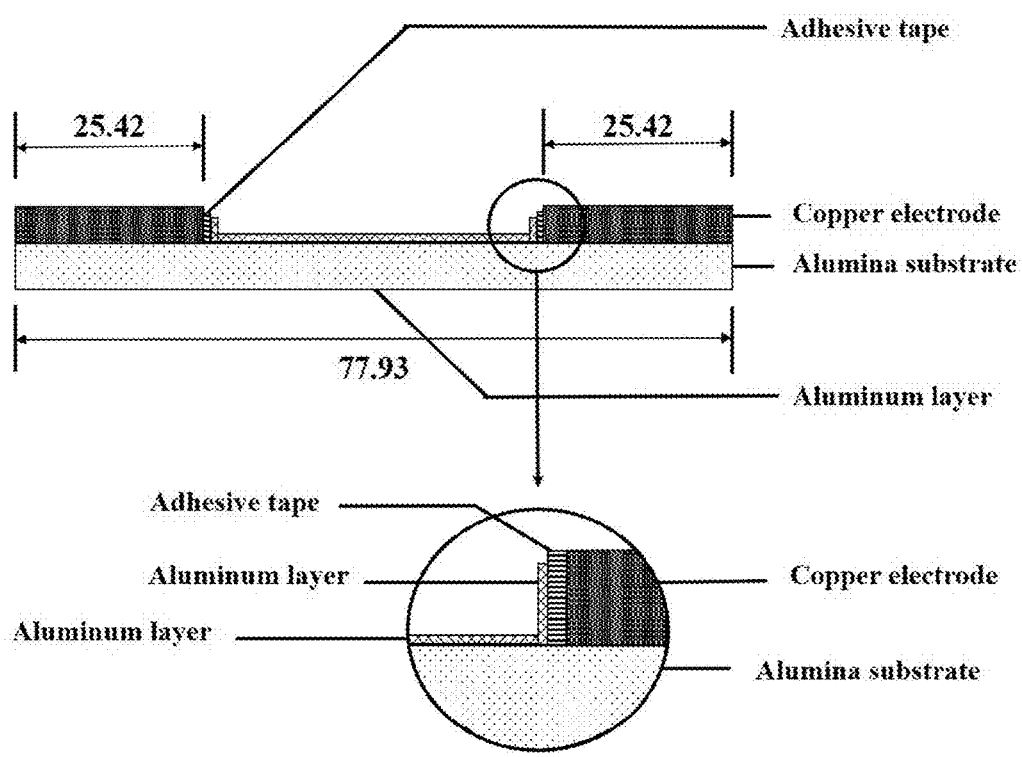
FIG. 10 illustrates testing configuration IV (3×3), which involves the printing of a metal-based material on a ceramic substrate. In the laboratory simulation, the metal is aluminum and the ceramic is aluminum oxide (dimensions 3 inches×3 inches). The substrate is made up of 9 squares of aluminum oxide (dimensions 1 inch×1 inch for each square) arranged in a 3×3 setup (i.e., a set-up with 3 squares by 3 squares). The stack of the multiple layers that constitute the layers in the printed object is on the substrate, i.e., in the 1 inch×1 inch area between the two electrodes. A continuous metal-based material film (aluminum foil in the laboratory simulation) lines both the substrate and the proximate vertical edges (i.e., the proximate edges that are essentially perpendicular to the plane of the substrate) of the two electrodes (copper in the laboratory simulation), such that a dielectric film (double-sided adhesive tape in the laboratory simulation) is positioned between the vertical edge of each electrode and the proximate vertical surface of the metal-based material film. The dielectric film serves to avoid electrical short-circuiting of the two electrodes.

Configuration IV, as illustrated in FIG. 10, is the same as configuration III, except that a single continuous layer of aluminum foil lines both the substrate (location A) and the proximate vertical edges of the two copper electrodes. Double-sided adhesive tape (commercial, three layers) is used to join the aluminum foil to the two electrodes. Configuration IV enables the current that flows from one electrode to the other electrode to flow in the aluminum foil layer to a greater degree than the case of configuration III. The adhesive tape also serves to provide an insulating (dielectric) film between the foil and each electrode, so that there is no short-circuiting of two electrodes. Short-circuiting means that the resistance is very small or negligible, and would make it not possible to measure the capacitance. By enhancing the current flow in the aluminum layer, the effectiveness of the technique to detect defects in the aluminum is enhanced.

Figure 11:
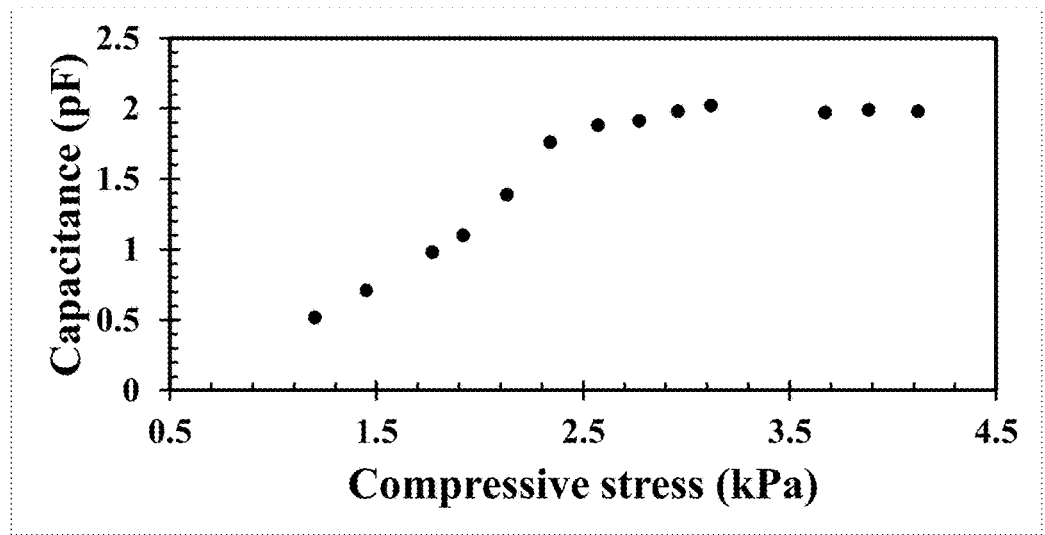
FIG. 11 shows the effect of the applied normal compressive stress on the capacitance measured between the two electrodes. (a) Configuration I, for which the stress for the capacitance to level off as the stress increases is 2.77 kPa at which the capacitance is 1.91 pF. (b) Configuration III, for which the stress for the capacitance to level off as the stress increases is 30.12 kPa, at which the capacitance is 15.55 pF.
Figure 11:
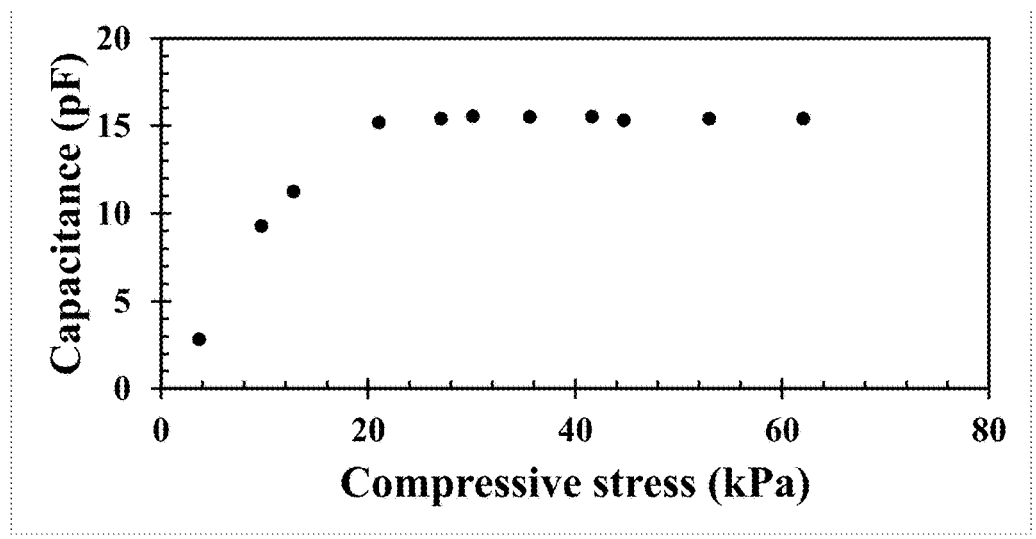

A known metal weight (electrically insulated) is placed on top of each copper electrode in order to provide an adequate electrical contact between the electrode and the specimen. This weight is determined by measuring the capacitance vs. pressure. The capacitance increases with increasing pressure, until it levels off, as shown in FIG. 11 in case of configurations I and III. The pressure applied to each electrode (with the weight of the copper included) is approximately the minimum pressure for the curve of capacitance vs. pressure to level off. The pressure used is 2.77 kPa (at which the capacitance is 1.91 pF) and 30.12 kPa (at which the capacitance is 15.55 pF) for polymer printing (configurations I and II) and metal printing (configuration respectively.

In all four configurations (I, II, III and IV), by using a known weight, a pressure of 2.71 kPa is applied to the stack in the direction perpendicular to the layers in the stack in order to consolidate the stack. Only the part of the substrate directly beneath the stack receives this pressure. The weight applied on a fractional layer is proportionally reduced, so that the pressure is kept the same, regardless of the area of the fractional layer.

The capacitance is measured using a precision LCR meter (Instek LCR-816 High Precision LCR Meter, 100 Hz-2 kHz). The frequency used is 2.000 kHz. The voltage is 1.000 V. The capacitance is that for the equivalent electrical circuit of a capacitor and resistor in series. Measurement of the capacitance is conducted firstly on the bare substrate and then conducted in the order of increasing number of layers in the stack and in the order of decreasing fraction of a layer in case of a single layer.

Example 3

Four configurations (I, II, III and IV) are used in the laboratory simulation of the layer-by-layer monitoring of 3D printing. The four configurations are described in Example 2.

Figure 12:
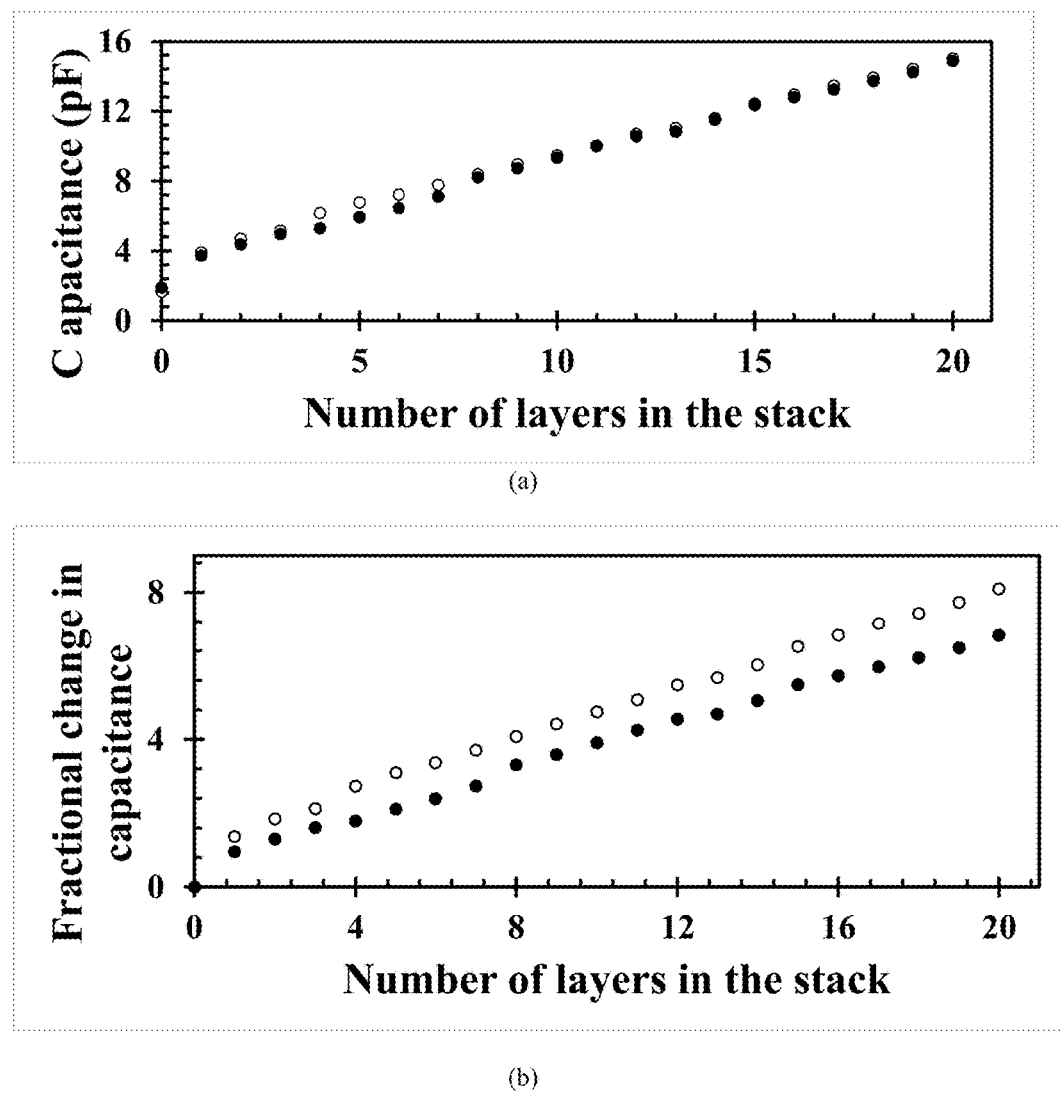
FIG. 12 shows the effect of the number of layers in the stack on the capacitance measured between the two electrodes in the case of the printing of a polymer-based material, with the polymer-based material simulated in the laboratory with cellulosic paper. (a) The capacitance. (b) The fractional change in capacitance relative to the case of the bare substrate (without the stack). Solid circles: configuration I. Open circles: configuration II.
Figure 13:
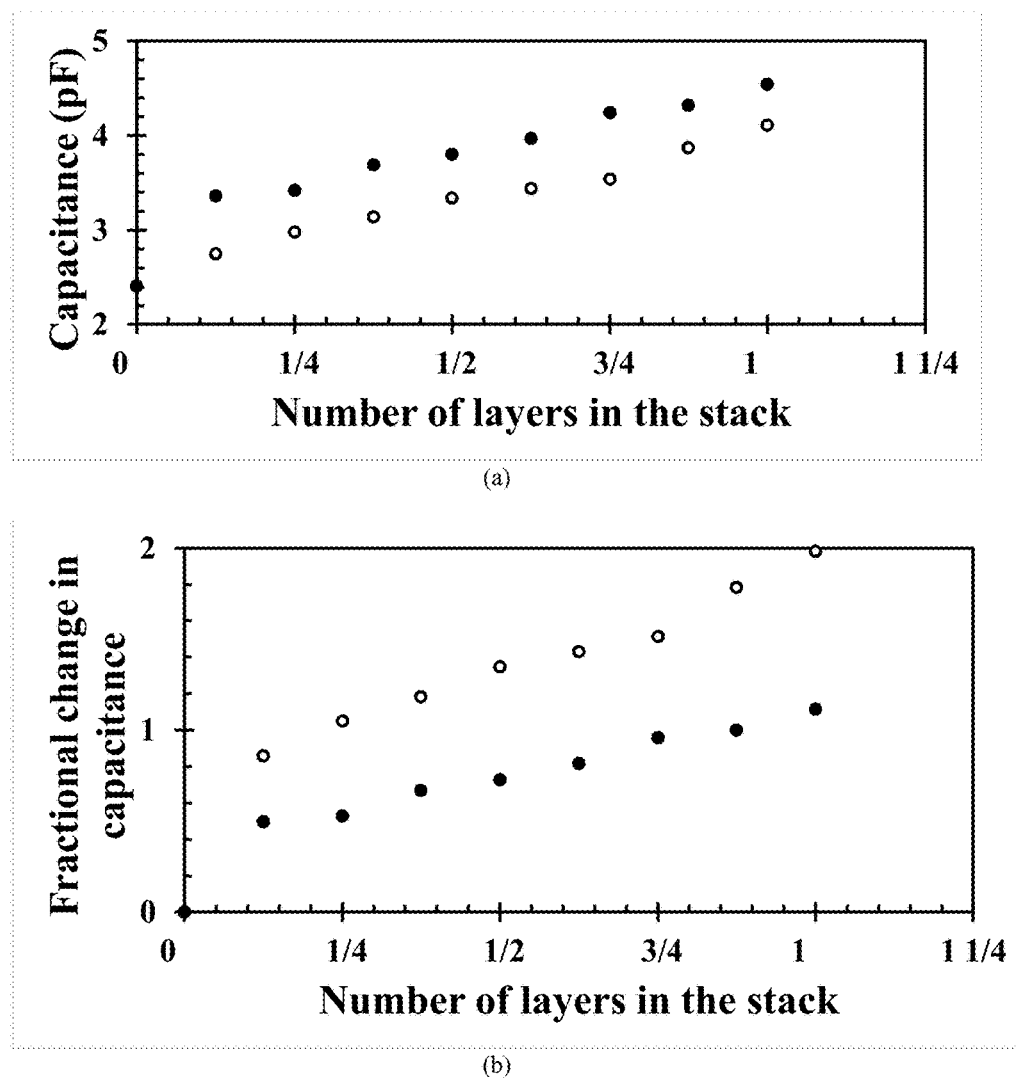
FIG. 13 shows the effect of the fraction of a layer on the capacitance measured between the two electrodes in the case of the printing of a polymer-based material, with the polymer-based material simulated in the laboratory with cellulosic paper. (a) The capacitance. (b) The fractional change in capacitance relative to the case of the bare substrate (without the stack). Solid circles: configuration I. Open circles: configuration II.

In case of configuration I (with the substrate in the form of cellulosic paper without slots, as described in Example 2) and configuration II (with the substrate in the form of cellulosic paper with slots, as described in Example 2), the capacitance increases monotonically with increasing number of layers, including fractional numbers of layers down to ⅛, thus indicating the effectiveness of the layer-by-layer monitoring (FIGS. 12 and 13). Configuration II is more effective than configuration I.

In case of whole numbers of layers, FIG. 12 shows that, for the same number of layers, the capacitance is essentially equal for configurations I and II, while the fractional change in capacitance relative to the bare substrate is higher for configuration II than configuration I. In case of fractions of a single layer, FIG. 13 shows that, for the same fraction of a layer, the capacitance is lower for configuration II than configuration I, while the fractional change in capacitance is higher for configuration II. The greater fractional change in capacitance for configuration II is attributed to the lower capacitance for the bare substrate (0 layer) for configuration II, as resulting from the slots in configuration II reducing the current that can flow in the substrate.

Figure 14:
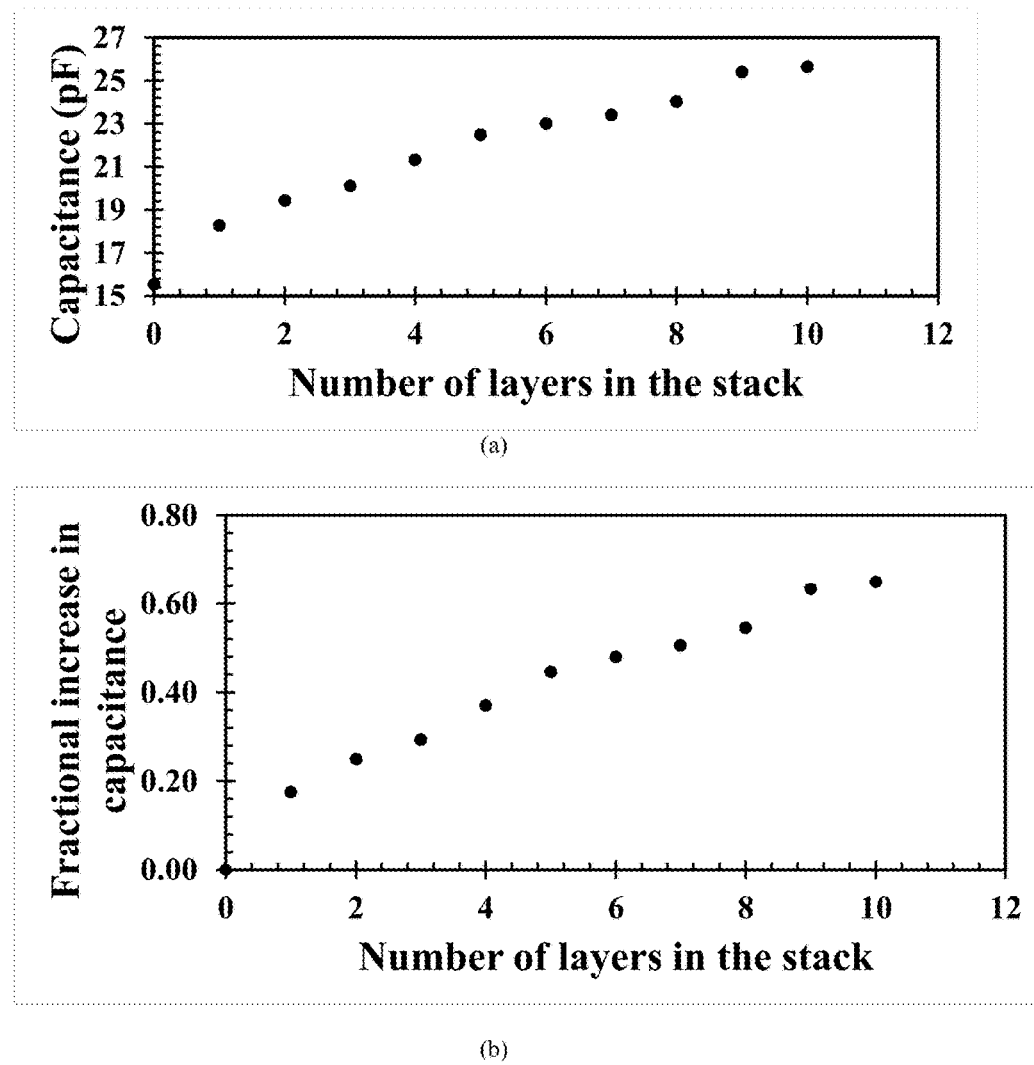
FIG. 14 shows the effect of the number of layers in the stack on the capacitance measured between the two electrodes in the case of the printing of a metal-based material, such that the printing is simulated in the laboratory with different numbers of layers of aluminum being printed on aluminum oxide using configuration III (3×3) (i.e., a set-up with 3 squares by 3 squares) for location A. (a) The capacitance. (b) The fractional change in capacitance relative to the case of the bare substrate (without the stack).
Figure 15:
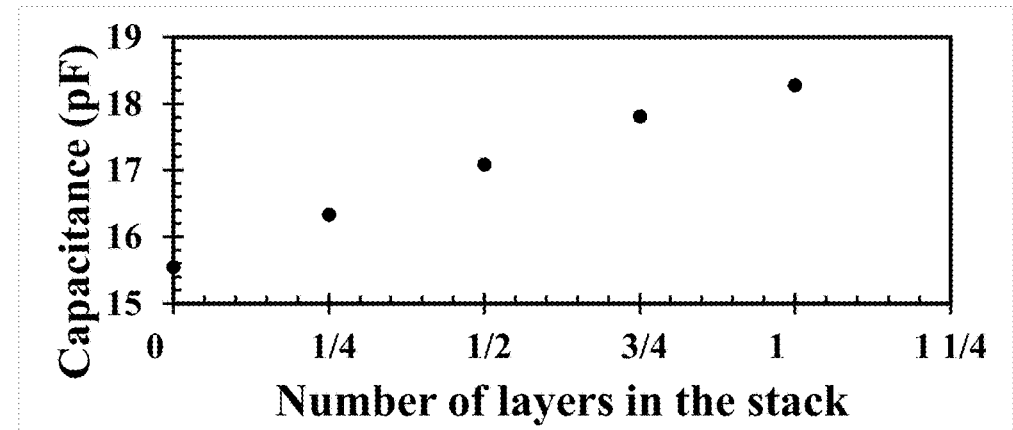
FIG. 15 shows the effect of the fraction of a layer on the capacitance measured between the two electrodes in the case of the printing of a metal-based material, such that the printing is simulated in the laboratory with fractions of a layer of aluminum being printed on aluminum oxide using configuration III (3×3) (i.e., a set-up with 3 squares by 3 squares) for location A. (a) The capacitance. (b) The fractional change in capacitance relative to the case of the bare substrate (without the stack).
Figure 15:
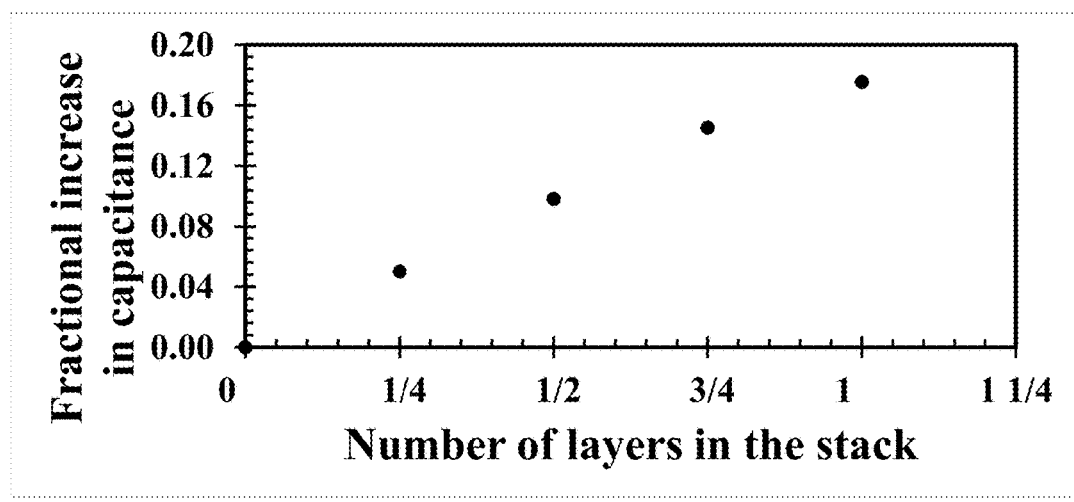

In case of configuration III (printing aluminum on aluminum oxide, 3×3 (i.e., a set-up with 3 squares by 3 squares, as described in Example 2), the layer-by-layer monitoring is also effective; including that of fractions of a single layer down to ¼ (FIGS. 14 and 15). The fraction of ⅛ is not included in the study concerning configuration III, but is included in the study concerning configurations I and II. This is because of the greater difficulty of cutting aluminum foil than cellulosic paper into narrow strips that can be handled.

Figure 16:
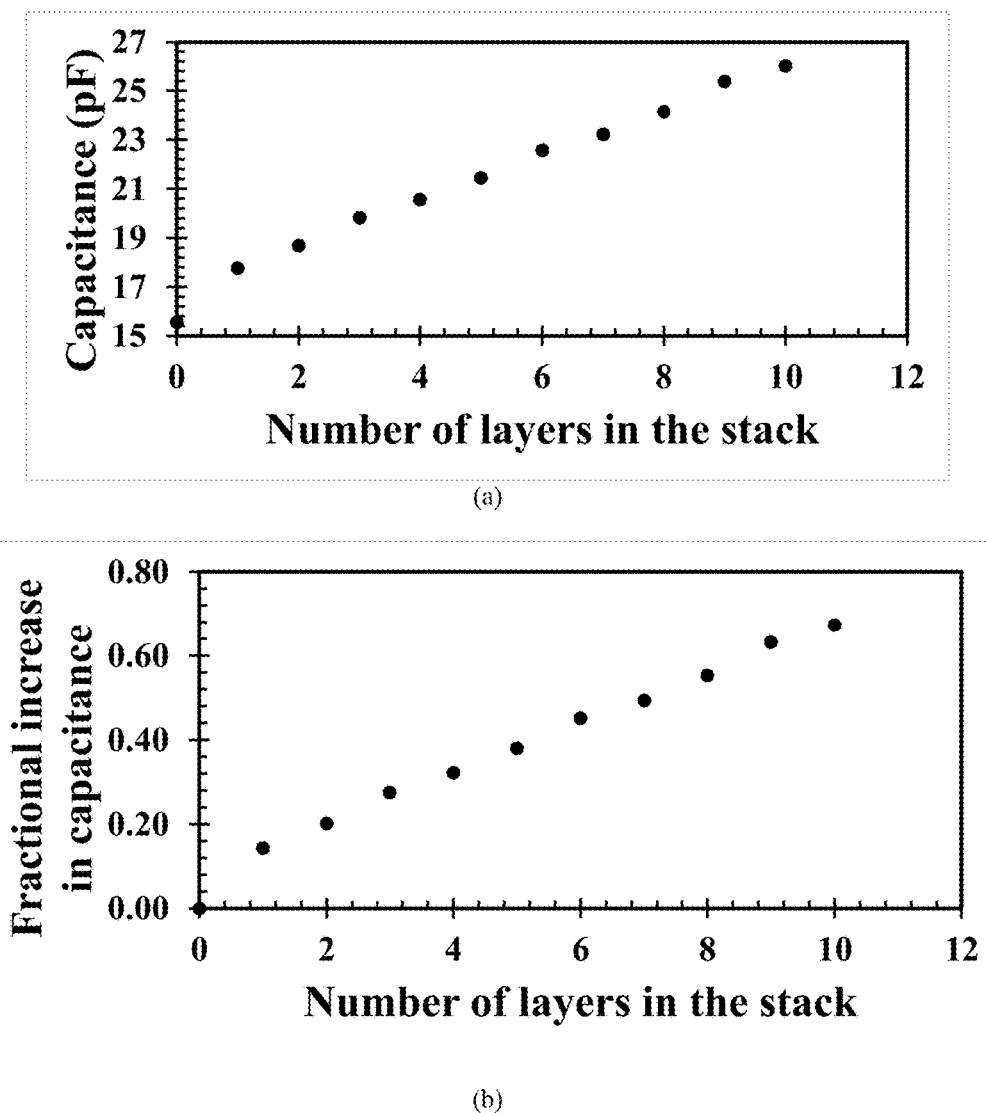
FIG. 16 shows the effect of the number of layers in the stack on the capacitance measured between the two electrodes in the case of the printing of a metal-based material, such that the printing is simulated in the laboratory using different numbers of layers of aluminum being printed on aluminum oxide using configuration III (3×3) (i.e., a set-up with 3 squares by 3 squares) for location B. (a) The capacitance. (b) The fractional change in capacitance relative to the case of the bare substrate (without the stack).
Figure 17:
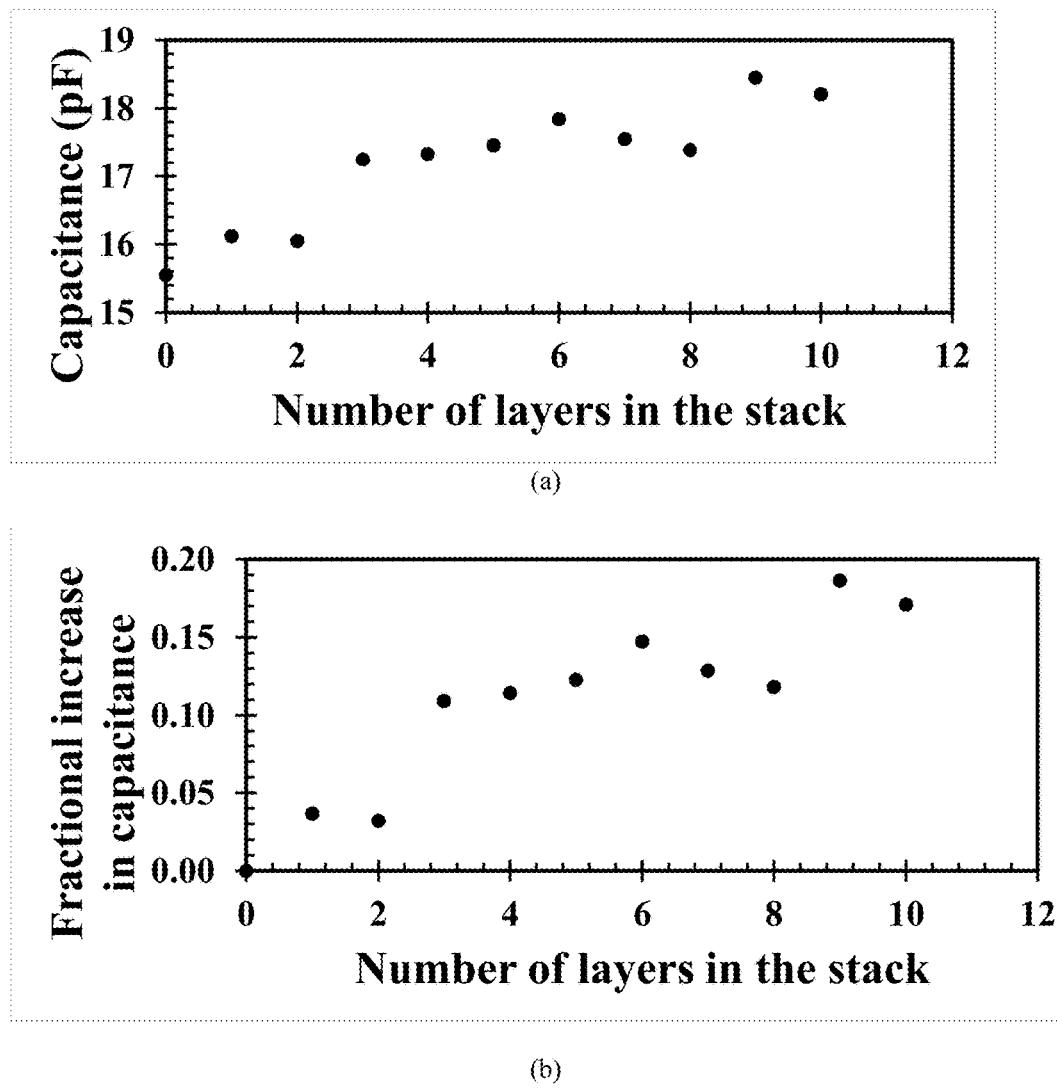
FIG. 17 shows the effect of the number of layers in the stack on the capacitance measured between the two electrodes in the case of the printing of a metal-based material, such that the printing is simulated in the laboratory using different numbers of layers of aluminum being printed on aluminum oxide using configuration III (3×3) (i.e., a set-up with 3 squares by 3 squares) for location C. (a) The capacitance. (b) The fractional change in capacitance relative to the case of the bare substrate (without the stack).
Figure 18:
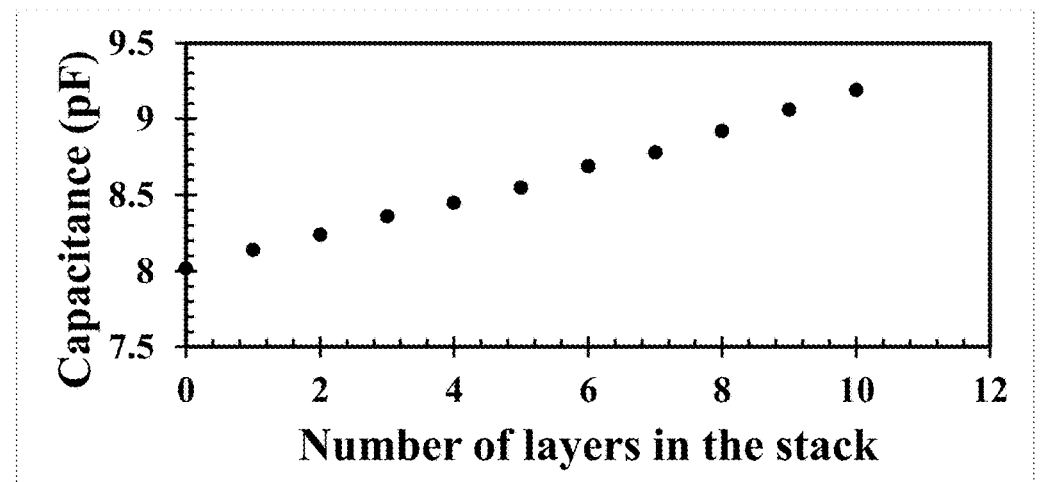
FIG. 18 shows the effect of the number of layers in the stack on the capacitance measured between the two electrodes in the case of the printing of a metal-based material, such that the printing is simulated in the laboratory using different numbers of layers of aluminum being printed on aluminum oxide using configuration III (5×5) (i.e., a set-up with 5 squares by 5 squares) for location A. (a) The capacitance. (b) The fractional change in capacitance relative to the case of the bare substrate (without the stack).
Figure 18:
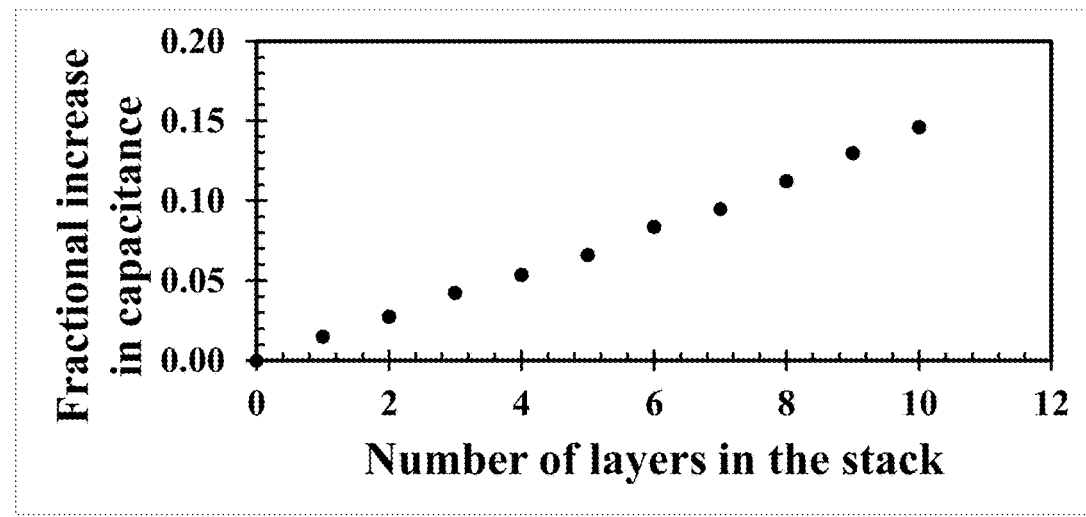
Figure 19:
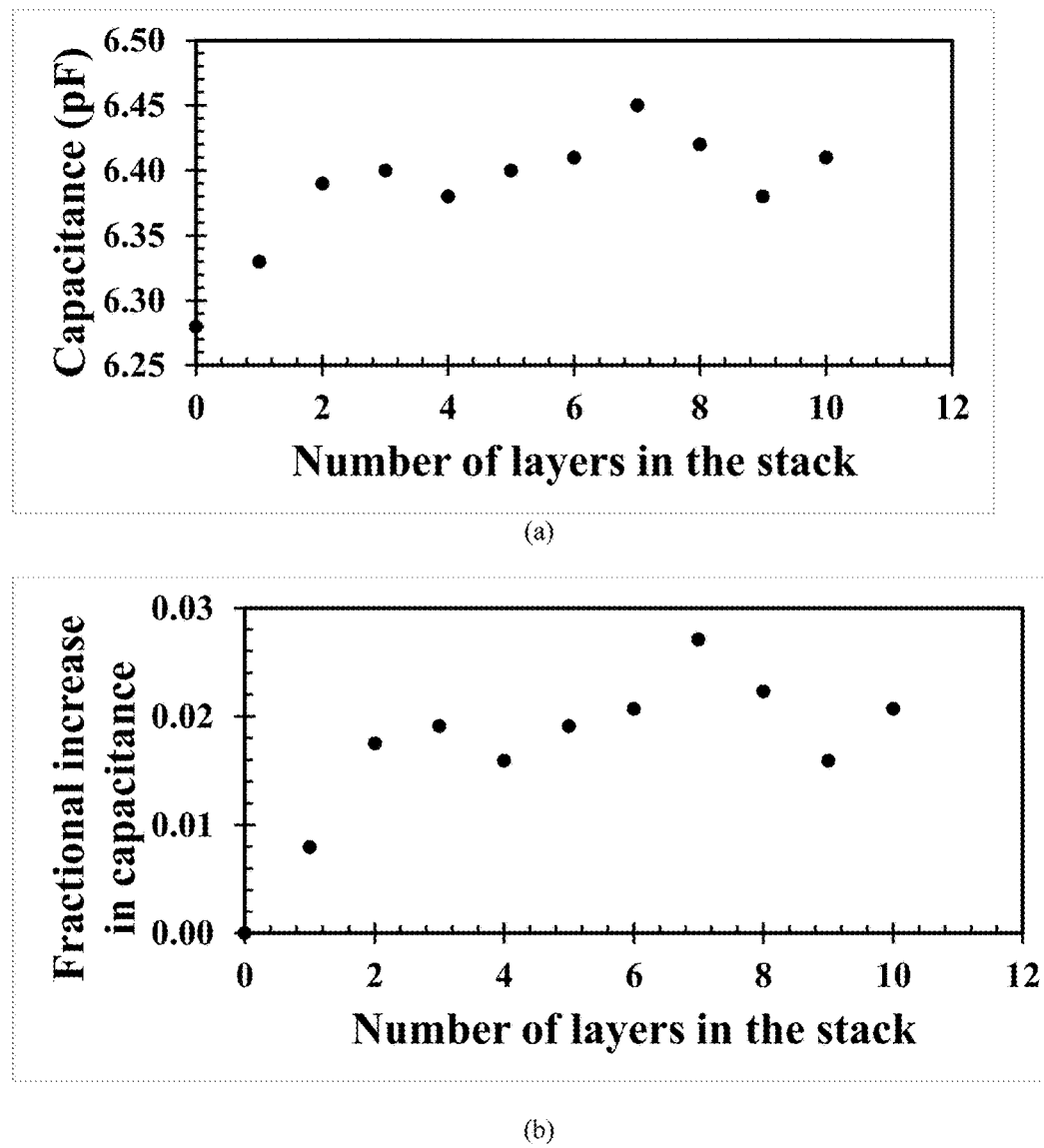
FIG. 19 shows the effect of the number of layers in the stack on the capacitance measured between the two electrodes in the case of the printing of a metal-based material, such that the printing is simulated in the laboratory using different numbers of layers of aluminum being printed on aluminum oxide using configuration III (7×7) (i.e., a set-up with 7 squares by 7 squares) for location A. (a) The capacitance. (b) The fractional change in capacitance relative to the case of the bare substrate (without the stack).
Figure 20:
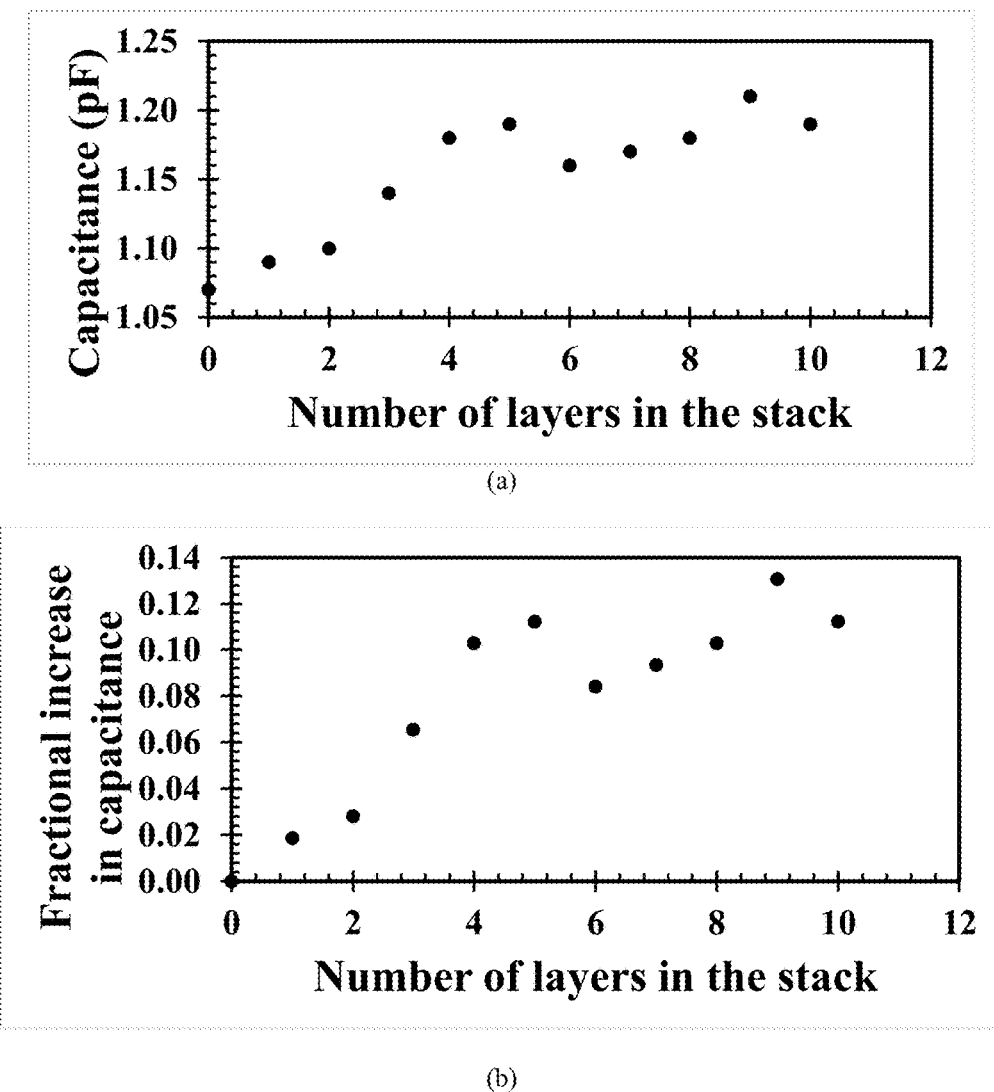
FIG. 20 shows the effect of the number of layers in the stack on the capacitance measured between the two electrodes in the case of the printing of a metal-based material, such that the printing is simulated in the laboratory by using different numbers of layers of aluminum being printed on aluminum oxide using configuration III (9×9) (i.e., a set-up with 9 squares by 9 squares) for location A. (a) The capacitance. (b) The fractional change in capacitance relative to the case of the bare substrate (without the stack).

FIGS. 14, 16 and 17 show corresponding results for locations A, B and C for configuration III (substrate arrangement 3×3). As shown in FIG. 7(a), location A is entirely between the two electrodes, location B is directly above region A, so that it is not between the two electrodes; and location C is directly above one of the electrodes. The monitoring is comparably effective for locations A and B, but is less effective for location C. For location C, the increase of the capacitance with the number of layers does not follow a smooth curve; for locations A and B, the increase follows a smooth curve. As shown in Table 1, the capacitance and fractional change in capacitance are both similar for locations A and B, but are considerably smaller for location C. This means that the electric field lines spreading away from the region between the two electrodes have no difficulty reaching location B strongly, but has difficulty reaching location C strongly.

TABLE 1

Results of laboratory simulation of capacitance-based layer-by-layer 3D printing monitoring. Regions A, B and C are defined in FIG. 7(a).

| Configuration | Location | Capacitance (pF) | | Fractional change in capacitance[¶] | | Correlation coefficient |
|---|---|---|---|---|---|---|
| | | 0 layer | 10 layers | 1 layer | 10 layers | |
| I* | A | 1.91 | 9.33 | 0.96 | 3.91 | 0.989 |
| II[†] | A | 1.65 | 9.48 | 1.37 | 4.75 | 0.978 |
| III[‡] | A | 15.55 | 25.65 | 0.18 | 0.65 | 0.977 |

TABLE 1-continued

Results of laboratory simulation of capacitance-based layer-by-layer 3D printing monitoring. Regions A, B and C are defined in FIG. 7(a).

| Configuration | Location | Capacitance (pF) | | Fractional change in capacitance¶ | | Correlation coefficient |
|---|---|---|---|---|---|---|
| | | 0 layer | 10 layers | 1 layer | 10 layers | |
| III‡ | B | 15.55 | 26.01 | 0.14 | 0.67 | 0.994 |
| III‡ | C | 15.55 | 18.21 | 0.04 | 0.17 | 0.910 |

*Paper on paper without slots.
†Paper on paper with slots.
‡Aluminum on aluminum oxide (3 × 3) (i.e., a set-up with 3 squares by 3 squares).
¶Relative to the case of 0 (zero) layer.

The correlation coefficient in the plot of capacitance (y value) vs. the number of layers (x value) is obtained by using the equation $$\text{Correlation coefficient} = \frac{\Sigma(x - x')(y - y')}{\sqrt{\Sigma(x - x')^2 \Sigma(y - y')^2}}, \quad (1)$$

where x' and y' are the averages of the x values and the y values. The higher is the correlation coefficient, the less is the data scatter associated with the curve of capacitance vs. the number of layers.

As shown in Table 1, the correlation coefficient is similarly high for location A of all three configurations (I, II and III). For configuration III, the coefficient is similarly high for locations A and B, but is lower for location C.

Among configurations I, II and III, Table 1 shows that configuration II gives the highest fractional change in capacitance, whereas configuration III gives the lowest fractional change. On the other hand, configuration III gives the highest capacitance, whereas both configurations I and II give similarly low values of the capacitance. The high capacitance for configuration III is attributed to the conductivity of aluminum and the consequent substantial current that can flow through the aluminum. In contrast, the cellulosic paper in configurations I and II is essentially electrically non-conductive. The high fractional change in capacitance for configurations I and II is due to the low value of the capacitance for the bare substrate (0 layer). The low fractional change for configuration III is due to the high value of the capacitance for the bare substrate. In practice, both a high fractional change in capacitance and a high capacitance are desirable.

Table 2 shows that the capacitance at 10 layers tends to be relatively low for location C of configuration II and III (substrate arrangement 3×3). For configuration III (substrate arrangement 5×5), the capacitance at 10 layers tends to decrease in the order from location A to location H. The fractional change in capacitance per layer, as obtained from the gradient of the best-fit straight line for the curve of fractional change in capacitance vs. the number of layers, is also shown in Table 2. This quantity shows the dependence on the location more clearly than the capacitance at 10 layers.

TABLE 2

Results of testing conducted for the stack of layers positioned at different locations relative to the electrodes. The fractional change in capacitance per layer is obtained from the gradient of the best-fit line obtained for the specific set of data.

| Configuration | Location | Capacitance at 10 layers (pF) | Fractional change in capacitance/ layer | Correlation coefficient |
|---|---|---|---|---|
| II | A | 4.750 | 0.3600 | 0.978 |
| II | B | 9.090 | 0.4100 | 0.985 |
| II | C | 2.630 | 0.0420 | 0.804 |
| III (3 × 3) | A | 25.65 | 0.0590 | 0.977 |
| III (3 × 3) | B | 26.01 | 0.0630 | 0.994 |
| III (3 × 3) | C | 18.21 | 0.0160 | 0.910 |
| III (5 × 5) | A | 9.190 | 0.0140 | 0.998 |
| III (5 × 5) | B | 9.080 | 0.0130 | 0.998 |
| III (5 × 5) | C | 8.640 | 0.0075 | 0.998 |
| III (5 × 5) | D | 9.060 | 0.0130 | 0.999 |
| III (5 × 5) | E | 8.920 | 0.0110 | 0.999 |
| III (5 × 5) | F | 8.330 | 0.0036 | 0.958 |
| III (5 × 5) | G | 8.240 | 0.0024 | 0.911 |
| III (5 × 5) | H | 8.230 | 0.0022 | 0.919 |

The correlation coefficient depends on the location, as shown in Table 2. For configurations II and III (substrate arrangement 3×3), the coefficient is high for locations A and B and is lower for location C. For configuration III (substrate arrangement 5×5), the coefficient is high for locations A, B, C, D and E, is lower for location F, and even lower for locations G and H. Nevertheless, the sensing is effective for all of the locations listed in Table 2.

FIGS. 15, 18, 19 and 20 show the results for location and configuration III for substrate arrangement 3×3, 5×5, 7×7 and 9×9, respectively. Table 3 shows the results for the cases of 1 and 10 layers. The capacitance measured for location A decreases in the order: 3×3, 5×5, 7×7 and 9×9, whatever is the number of layers. The fractional increase in capacitance at location A due to the layers decreases from 3×3 to 5×5, whatever is the number of layers. The fractional increase in capacitance remains low for 7×7 and 9×9. The correlation coefficient is high for substrate arrangements 3×3 and 5×5, but is lower for 7×7 and even lower for 9×9. Thus, the maximum distance between the electrodes for reliable sensing corresponds to the case of substrate arrangement 5×5.

TABLE 3

Results of testing conducted for location A for substrate arrangements 3 × 3, 5 × 5, 7 × 7 and 9 × 9 and configuration III.

| Substrate arrangement | Capacitance (pF) | | Fractional increase in capacitance* | | Correlation coefficient |
|---|---|---|---|---|---|
| | 0 layer | 10 layers | 1 layer | 10 layers | |
| 3 × 3 | 15.55 | 25.65 | 0.18 | 0.65 | 0.977 |
| 5 × 5 | 8.02 | 9.19 | 0.01 | 0.15 | 0.998 |
| 7 × 7 | 6.28 | 6.41 | 0.01 | 0.02 | 0.674 |
| 9 × 9 | 1.07 | 1.19 | 0.02 | 0.11 | 0.283 |

*Relative to the case of zero (0) layer.

Figure 21:
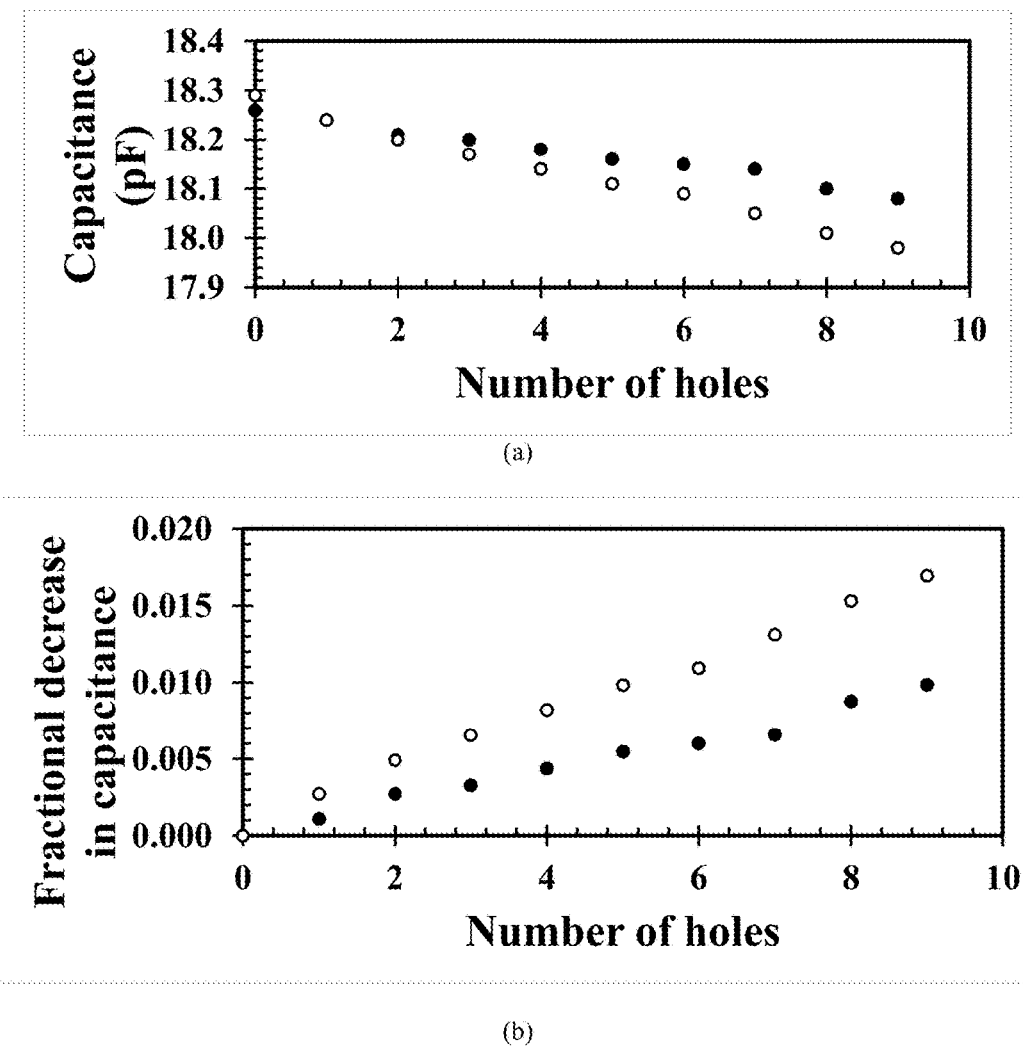
FIG. 21 shows the effect of defects in the form of through holes on the capacitance measured between the two electrodes in the case of the printing of a metal-based material, such that the printing is simulated in the laboratory by using a single layer of aluminum, which is on aluminum oxide. Solid circles: configuration III (3×3 substrate arrangement, i.e., a set-up with 3 squares by 3 squares), location A). Open circles: configuration IV. (a) The capacitance. (b) The fractional decrease in capacitance relative to the layer with no holes.

Concerning the detection of defects, FIG. 21 shows the relationship between the number of holes and (a) the capacitance and (b) the fractional decrease in capacitance. The fractional decrease is measured in relation to a layer with no holes. The capacitance decreases monotonically in very small steps as the number of holes is increased (FIG. 21(*a*)). Also, as the number of holes is increased, the fractional decrease in capacitance increases monotonically. This means that the defect detection is feasible. The capacitance decrease is attributed to the decrease in the effective electrical permittivity of the aluminum due to the holes and the fact that the relative permittivity of air is low (equal to 1).

FIG. 21 shows that configuration IV is more effective than configuration III for sensing defects in the form of holes. Configuration IV gives larger fractional decrease in capacitance and greater linearity in the curve of the capacitance vs. number of holes. The superiority of configuration IV is expected, due to the enhanced current path through the aluminum in configuration IV.

Although preferred embodiments have been depicted and described in detail herein, it will be apparent to those skilled in the relevant art that various additions, substitutions, modifications and the like can be made without departing from the spirit of the invention and these are therefore considered to be within the scope of the invention as defined in the claims which follow.

What is claimed:

1. A system for monitoring three-dimensional printing of printing material,
    said system comprising two coplanar electrodes,
        said electrodes being electrically conductive,
    said system also comprising substrate,
        said substrate providing a surface on which said printing occurs,
    said electrodes being positioned on said substrate,
        said electrodes exhibiting proximate edges,
        said edges being separate from one another by a distance,
        said distance ranging from 5 mm to 300 mm,
        each of said electrodes being smaller in area than said substrate,
    said system also comprising a plurality of layers,
        said layers being derived from said printing material,
        said layers being formed layer-by-layer on said substrate by said printing,
        said layers being positioned in a region,
            said region extending from the location of one said edge to the location of the other said edge,
    said two electrodes being electrically oppositely charged,
        said charge being enabled by an alternating electric current,
        said alternating electric current flowing between said two electrodes,
        said alternating electric current partly flowing in said layers,
    said two electrodes exhibiting a capacitance between them,
        said capacitance ranging from 0.1 pF to 10 nF.

2. The system of claim 1, wherein said layers comprise material selected from the group consisting of: metal, metal alloy, metal-based material, metal-matrix composite, aluminum, copper, nickel, titanium, steel, ceramic, aluminum oxide, aluminum nitride, silicon carbide, silicon dioxide, ceramic-based material, ceramic-matrix composite, cement-based material, cement paste, cement mortar, concrete, polymer, polymer-based material, polymer-matrix composite, thermosetting polymer, thermoplastic polymer, biopolymer, photopolymer, organic-based material, and combinations thereof.

3. The system of claim 1, wherein said substrate comprises material selected from the group consisting of: ceramic, ceramic-based material, ceramic-matrix composite, aluminum oxide, aluminum nitride, silicon carbide, silicon dioxide, cement-based material, cement paste, cement mortar, concrete, polymer, polymer-based material, polymer-matrix composite, organic-based material, and combinations thereof.

4. The system of claim 1, wherein said electrodes comprise material selected from the group consisting of: metal, metal alloy, metal-based material, metal-matrix composite, aluminum, copper, nickel, titanium, steel, electrically conductive polymer, and combinations thereof.

5. The system of claim 1, wherein said two electrodes are the same in composition.

6. The system of claim 1, wherein said two electrodes are electrically connected,
    said electrical connection being positioned on said substrate, and
    said electrical connection providing an exterior surface on which said printing occurs.

7. A system for monitoring three-dimensional printing of printing material,
    said system comprising two coplanar electrodes,
        said electrodes being electrically conductive,
    said system also comprising substrate,
        said substrate providing a surface on which said printing occurs,
    said electrodes being positioned on said substrate,
        said electrodes exhibiting proximate edges,
        said edges being separate from one another by a distance,
        each of said electrodes being smaller in area than said substrate,
    said system also comprising a plurality of layers,
        said layers being derived from said printing material,
        said layers being material selected from the group consisting of: metal, metal alloy, metal-based material, metal-matrix composite, aluminum, copper, nickel, titanium, steel, and combinations thereof,
        said layers being formed layer-by-layer on said substrate by said printing,
        said layers being positioned in a region,
            said region extending from the location of one said edge to the location of the other said edge,
    said two electrodes being electrically oppositely charged,
        said charge being enabled by an alternating electric current, said alternating electric current flowing from one electrode to the other electrode,
said alternating electric current partly flowing in said layers,
said two electrodes exhibiting a capacitance between them,
said capacitance ranging from 0.1 pF to 10 nF.

8. The system of claim 7, wherein said distance ranges from 5 mm to 300 mm.

9. The system of claim 7, wherein said two electrodes are electrically connected,
said electrical connection being positioned on said substrate,
said electrical connection providing an exterior surface on which said printing occurs,
said electrical connection comprising material selected from the group consisting of: metal, metal alloy, metal-based material, metal-matrix composite, aluminum, copper, nickel, titanium, steel, and combinations thereof,
said electrical connection extending the distance between said two proximate edges.

10. The system of claim 7, wherein said two electrodes are electrically connected,
said electrical connection comprising material selected from the group consisting of: metal, metal alloy, metal-based material, metal-matrix composite, aluminum, copper, nickel, titanium, steel, and combinations thereof,
said electrical connection extending the distance between said two proximate edges,
a dielectric film being positioned between said electrical connection and at least one of said electrodes,
said dielectric film exhibiting electrical resistance.

11. The system of claim 7, wherein said substrate comprises material selected from the group consisting of: ceramic, ceramic-based material, ceramic-matrix composite, aluminum oxide, aluminum nitride, silicon carbide, silicon dioxide, and combinations thereof.

12. The system of claim 7, wherein said electrodes comprise material selected from the group consisting of: metal, metal alloy, metal-based material, metal-matrix composite, aluminum, copper, nickel, titanium, steel, and combinations thereof.

13. The system of claim 7, wherein said two electrodes are the same in composition.

14. A method of monitoring the three-dimensional printing of printing material,
said method comprising
(a) positioning two coplanar electrodes on a substrate,
said electrodes being electrically conductive,
said electrodes exhibiting proximate edges, said edges being separate from one another by a distance,
said electrodes being smaller in area than said substrate,
said substrate providing a surface on which said printing occurs,
said printing involving layer-by-layer formation of a plurality of layers on said substrate,
said layers being derived from said printing material,
said layers being positioned in a region,
said region extending from the location of one said edge to the location of the other said edge,
said electrodes being electrically oppositely charged,
said charge being enabled by an alternating electric current,
said alternating electric current flowing from one electrode to the other electrode,
said alternating electric current partly flowing in said layers,
and
(b) measuring the capacitance between said two electrodes.

15. The method of claim 14, wherein said distance ranges from 5 mm to 300 mm.

16. The method of claim 14, wherein said two electrodes are the same in composition.

17. The method of claim 14, wherein each of said electrodes comprises material selected from the group consisting of: metal, metal alloy, metal-based material, metal-matrix composite, aluminum, copper, nickel, titanium, steel, electrically conductive polymer, and combinations thereof.

18. The method of claim 14, wherein said substrate comprises material selected from the group consisting of: ceramic, ceramic-based material, ceramic-matrix composite, aluminum oxide, aluminum nitride, silicon carbide, silicon dioxide, cement-based material, cement paste, cement mortar, concrete, polymer, polymer-based material, polymer-matrix composite, organic-based material, and combinations thereof.

19. The method of claim 14, wherein said layers comprise material selected from the group consisting of: metal, metal alloy, metal-based material, metal-matrix composite, aluminum, copper, nickel, titanium, steel, ceramic, ceramic-based material, ceramic-matrix composite, aluminum oxide, aluminum nitride, silicon carbide, silicon dioxide, cement-based material, cement paste, cement mortar, concrete, polymer, polymer-based material, polymer-matrix composite, thermosetting polymer, thermoplastic polymer, biopolymer, photopolymer, organic-based material, and combinations thereof.

20. The method of claim 14, wherein said two electrodes are electrically connected,
said electrical connection being positioned on said substrate, and
said electrical connection providing an exterior surface on which said printing occurs.

* * * * *